United States Patent [19]

Sagane et al.

[11] Patent Number: 5,239,006
[45] Date of Patent: Aug. 24, 1993

[54] CYCLOOLEFIN RANDOM COPOLYMER COMPOSITION AND USES THEREOF

[75] Inventors: Toshihiro Sagane; Masayuki Okabe, both of Yamaguchi, Japan

[73] Assignee: Mitsui Petrochemical Industries, Ltd., Tokyo, Japan

[21] Appl. No.: 781,970

[22] Filed: Oct. 24, 1991

[30] Foreign Application Priority Data

| Oct. 24, 1990 | [JP] | Japan | 2-286799 |
| Oct. 24, 1990 | [JP] | Japan | 2-286800 |
| Oct. 24, 1990 | [JP] | Japan | 2-286801 |
| Aug. 23, 1991 | [JP] | Japan | 3-212414 |

[51] Int. Cl.$^5$ .................. C08L 23/08; C08L 45/00
[52] U.S. Cl. .................. 525/211; 525/191; 525/210; 526/281; 526/282; 369/288
[58] Field of Search .......... 525/210, 211, 191; 526/281, 282, 283; 369/288

[56] References Cited

FOREIGN PATENT DOCUMENTS

| 0156464 | 10/1985 | European Pat. Off. |
| 0291208 | 11/1988 | European Pat. Off. |
| 0335985 | 10/1989 | European Pat. Off. |
| 0361909 | 4/1990 | European Pat. Off. |

OTHER PUBLICATIONS

Japanese Patent Abstract, No. 61-98780, Application No. 59-220550, May 17, 1986.
Japanese Patent Abstract, No. 61-120816(A), Application No. 59-242336, Jun. 7, 1986.
Japanese Patent Abstract, No. 61-115916(A), Application No. 59-236829, Jun. 3, 1986.

Primary Examiner—Fred Teskin
Attorney, Agent, or Firm—Sherman and Shalloway

[57] ABSTRACT

Cycloolefin random copolymer compositions which contain a blend of at least two or three cycloolefin random copolymers are disclosed. The random copolymers are obtained by copolymerization of ethylene and at least one of two cycloolefins. The resin compositions exhibit excellent moldability and transparency, heat resistance, thermal aging resistance, chemical resistance, solvent resistance, dielectric and mechanical characteristics and transferability of the pit.

3 Claims, No Drawings

CYCLOOLEFIN RANDOM COPOLYMER COMPOSITION AND USES THEREOF

FIELD OF THE INVENTION

This invention relates to resin compositions which exhibit excellent characteristics such as moldability and transferability when they are used for forming therefrom optical instrument parts such as substrates for information recording media, and to substrates for information recording media and optical instrument parts formed therefrom.

BACKGROUND OF THE INVENTION

The present applicant has already advanced various proposals on cycloolefin random copolymers formed from ethylene and specific cycloolefins, for example, in Japanese Patent L-O-P Publn. No. 168708/1985, and Japanese Patent Application Nos. 220550/1984, 236828/1984, 236829/1984 and 242336/1984. The cycloolefin copolymers thus proposed have excellent transparency and are also excellent in various characteristics such as heat resistance, thermal aging resistance, chemical resistance, solvent resistance, dielectric characteristics and mechanical characteristics. Further, these cycloolefin random copolymers are also excellent in adhesive properties to structures of various kinds of materials, though said random copolymers are considered as a kind of polyolefin Accordingly, these cycloolefin random copolymers have such characteristics basically suitable for use as the resins for forming substrates for information recording media or forming optical instruments such as optical fibers.

The cycloolefin random copolymers as mentioned above possess characteristics suitable basically for use as the resins for forming optical instrument parts. After thorough investigations, however, it was found that when the above-mentioned cycloolefin random copolymers are used for forming substrates for information recording media, for example, optical memory disc, CD disc and laser disc, the moldability attained at the time of molding these copolymers into a disc or the transferability of the recorded information from a master disc to a fresh disc is not always satisfactory. That is, in an information recording medium such as an optical memory disc, CD disc or laser disc, which is used exclusively for reproduction purposes, information is recorded therein by corresponding the existence or nonexistence of the pit formed on the disc substrate to a signal of "0" or "1". In order to prepare a substrate having a recorded information thereon, there is usually employed a molding method in which a resin is injection molded into a substrate using a master disc. If the resin used in the process mentioned above is low in flowability, no satisfactory transfer of the pit from the master disc to a fresh disc is attained sometimes and thereby causing an error in reading of the disc obtained, because the pit usually has such a very small diameter as of not more than 1 $\mu$m, and said resin is found to be poor in moldability. On the other hand, the transferability of the pit is improved if a resin having a high flowability is used, but the resulting disc substrate is deteriorated sometimes in mechanical characteristics.

Under such circumstances, as mentioned above, the present inventors found that resin compositions which are high in moldability and also excellent in transferability of the pit are obtained by using a blend of at least two kinds of cycloolefin random copolymers in such a manner that the specific requirements defined in the present invention are satisfied, and eventually have accomplished the invention.

OBJECT OF THE INVENTION

An object of the present invention is to provide novel resin compositions capable of forming molded products, said resin compositions having excellent moldability, transparency, heat resistance, thermal aging resistance, chemical resistance, solvent resistance, dielectric characteristics and mechanical characteristics, and also being excellent in transferability of the pit.

A further object of the invention is to provide substrates for information recording media, said substrates being formed from such resin compositions having characteristics as mentioned above.

Another object of the invention is to provide optical materials and products formed from such resin compositions having characteristics as mentioned above.

SUMMARY OF THE INVENTION

The first cycloolefin random copolymer compositions of the present invention are characterized in that the compositions contain a blend of at least two cycloolefin random copolymers obtained by copolymerization of ethylene and at least one cycloolefin represented by the following formula [I] or [II], said copolymer having a softening temperature (TMA) of at least 70° C., an intrinsic viscosity [$\eta$], as measured at 135° C. in decalin, of at least 0.01 dl/g, and the Mw/Mn ratio of a weight average molecular weight (Mw) to a number average molecular weight (Mn), as measured by GPC, of not more than 4, and said compositions having an intrinsic viscosity [$\eta$], as measured at 135° C. in decalin, of 0.2 to 0.7 dl/g, and the Mw/Mn ratio of a weight average molecular weight (Mw) to a number average molecular weight (Mn), as measured by GPC, of at least 3.

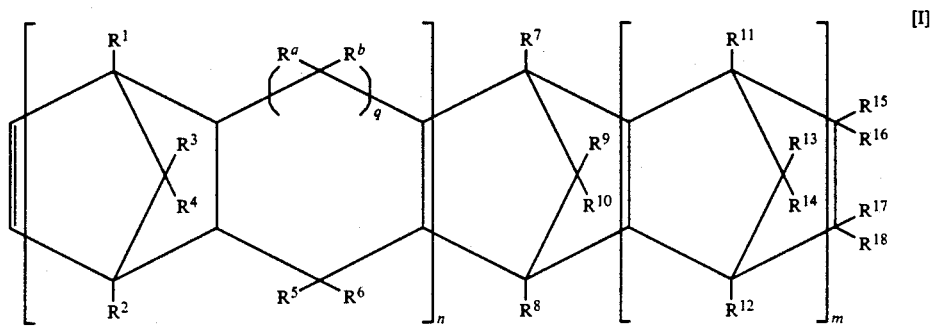

wherein n is 0 or 1, m is 0 or an integer of a positive number, q is 0 or 1, $R^1$-$R^{18}$ and $R^1$ and $R^b$ are each an atom or a group selected from the group consisting of hydrogen atom, halogen atom and hydrocarbon groups, $R^{15}$-$R^{18}$, linked with one another, may form a monocyclic ring or polycyclic ring which may have a double bond, $R^{15}$ and $R^{16}$, or $R^{17}$ and $R^{18}$ may together form an alkylidene group.

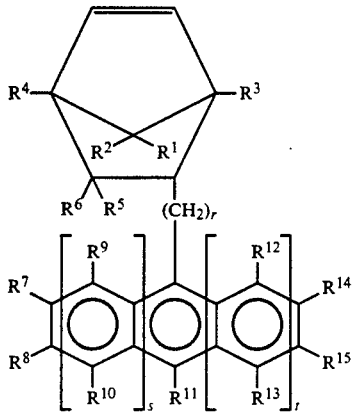

[II]

wherein r is 0 or an integer of more than 1, s and t are each 0, 1 or 2, $R^1$-$R^{15}$ are each an atom or a group selected from the group consisting of hydrogen atom, halogen atom, aliphatic hydrocarbon groups, aromatic hydrocarbon groups and alkoxy groups, and the carbon atom having $R^5$ and $R^6$ may be bonded to the carbon atom having $R^7$ or $R^9$ directly or through an alkylene group of 1-3 carbon atoms.

The second cycloolefin random copolymer compositions of the invention are characterized in that the compositions contain a blend of at least two cycloolefin random copolymers obtained by copolymerization of ethylene and at least one cycloolefin represented by the above-mentioned formula [I] or [II], said copolymers having a softening temperature (TMA) of at least 70° C., and said compositions having the Cw/Cn ratio of a weight average cycloolefin content (Cw) to a number average cycloolefin content (Cn), as defined respectively by the following formulas (1) and (2), of at least 1.04.

$$Cw = \sum_{i=1}^{m} Ci\ Wi \quad (1)$$

$$Cn = 1/\sum_{i=1}^{m} (Wi/Ci) \quad (2)$$

wherein m is an integer of at least 2, Ci and Wi each represent the cycloolefin content (mol %) in a cycloolefin random copolymer component (i component) and a weight fraction of the i component present in the composition.

The third cycloolefin random copolymer compositions of the invention are characterized in that the compositions contain a blend of at least three cycloolefin random copolymers obtained by copolymerization of ethylene and at least one cycloolefin represented by the above-mentioned formula [I] or [II] and have a softening temperature (TMA) of at least 70° C., and when cycloolefin random copolymer components contained in the compositions are taken as $S_1, S_2 \ldots S_i \ldots S_n$ (n is an integer of at least 3), a softening temperature (TMA) of each component ($S_i$) is taken as $T_i$(°C.), and a weight percentage of each component ($S_i$) present in the compositions is taken as $W_i$, $T_i$ and $W_i$ satisfy the following formulas (3), (4) and (5), $$T_i < T_{i+1} \quad (3)$$

(wherein i is an integer of 1 to n−1,)

$$T_1 < 70\ (°C.) \quad (4)$$

$$0.01 \leq W_i / \sum_{i=1}^{n} W_i \leq 0.99 \quad (5)$$

a haze of the two-component composition containing the components $S_i$ and $S_{i+1}$ in the blend ratio of $W_i$-$W_{i+1}$ by weight is not more than 7.0%, and the sum total of the components having a softening temperature (TMA) of less than 70° C. is more than 10 wt % of the whole composition.

The substrates for information recording media of the invention are characterized in that they are formed from the above-mentioned first, second or third resin compositions of the invention.

The optical materials of the invention are characterized in that they are formed from the above-mentioned first, second or third resin compositions of the invention.

The cycloolefin random copolymer compositions of the invention as illustrated above are obtained by using a blend of at least two copolymers of ethylene and specific cycloolefins in such a manner that the above-mentioned specific requirements defined in the invention are satisfied, hence the resin compositions thus obtained are excellent in heat resistance, thermal aging resistance, mechanical characteristics, chemical resistance, solvent resistance and dielectric characteristics without sacrificing transparency inherent in cycloolefin random copolymers, and capable of forming molded products excellent in moldability and transferability of recorded information and also excellent in adhesion to an information recording film.

Accordingly, the optical materials of the invention formed from the above-mentioned cycloolefin random copolymer compositions, such as substrates for information recording media, have high transparency inherent in cycloolefin random copolymers and, at the same time, are excellent in heat resistance, thermal aging resistance, mechanical characteristics, chemical resistance, solvent resistance and dielectric resistance.

DETAILED DESCRIPTION OF THE INVENTION

The cycloolefin random copolymer compositions of the present invention are illustrated below in detail.

The cycloolefin random copolymer compositions of the invention contain a blend of at least two cycloolefin random copolymers obtained by copolymerization of ethylene and specific cycloolefins.

The cycloolefin copolymers to be contained in the resin compositions of the invention include random copolymers formed from recurring units derived from ethylene and from either one of cycloolefins represented by the following formulas [I] or [II]. The cycloolefins used herein may be a combination of two or more.

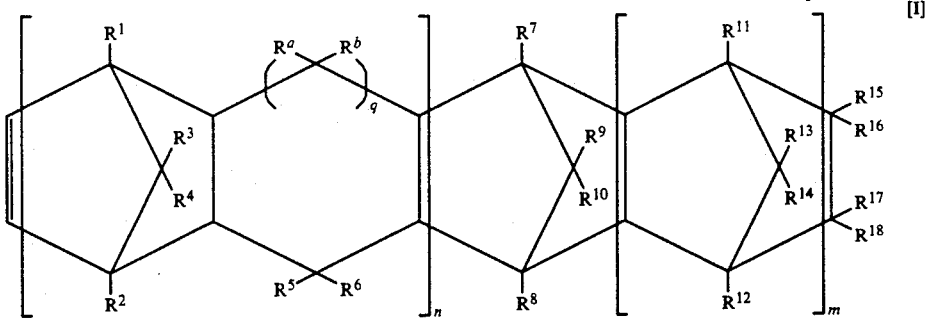

wherein n is 0 or 1, m is 0 or an integer of a positive number, q is 0 or 1, $R^1$-$R^{18}$ and $R^a$ and $R^b$ are each independently an atom or a group selected from the group consisting of hydrogen atom, halogen atom and hydrocarbon groups, $R^{15}$-$R^{18}$, linked with one another, may form a monocyclic or polycyclic ring which may have a double bond, $R^{15}$ and $R^{16}$, or $R^{17}$ and $R^{18}$ may together form an alkylidene group.

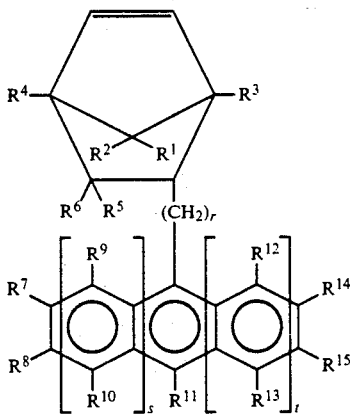

wherein r is 0 or an integer of more than 1, s and t are each 0, 1 or 2, $R^1$-$R^{15}$ are each an atom or group selected from the group consisting of hydrogen atom, halogen atom, aliphatic hydrocarbon, aromatic hydrocarbon and alkoxyl groups, and the carbon atom having $R^5$ and $R^6$ may be bonded to the carbon atom having $R^7$ or $R^9$ directly or through an alkylene group of 1-3 carbon atoms.

In the formula [I] mentioned above, n is 0 or 1, preferably 0, m is 0 or an integer of a positive number, preferably 0 to 3, and q is 0 or 1.

In the formula [II] mentioned above, r is 0 or an integer of more than 1, preferably an integer of 0 to 3. $R^1$-$R^{18}$, $R^a$ and $R^b$ in the formula [1] and $R^1$-$R^{15}$ in the formula [II] are each independently an atom or a group selected from the group consisting of hydrogen atom, halogen atom and hydrocarbon groups. The halogen atom as referred to above includes, for example, fluorine, chlorine, bromine and iodine atoms. The hydrocarbon groups as referred to above each independently include alkyls of usually 1 to 6 carbon atoms and cycloalkyls of 3 to 6 carbon atoms. Concrete examples of the alkyl group include methyl, ethyl, isopropyl, isobutyl and amyl, and concrete examples of the cycloalkyl group include cyclohexyl, cyclopropyl, cyclobutyl and cyclopentyl.

In the formula [II] mentioned above, the carbon atom having $R^5$ and $R^6$ may be bonded to the carbon atom having $R^7$ or $R^9$ directly or through an alkylene group of 1-3 carbon atoms, that is, $R^5$ or $R^6$ and $R^9$ or $R^7$ may together form an alkylene group selected from among methylene (—$CH_2$—) ethylene (—$CH_2CH_2$—) and propylene (—$CH_2CH_2CH_2$—).

In the above-mentioned formula [I], when q is 0, a ring represented by means of q is a 5-membered ring.

In the above-mentioned formula [I], $R^{15}$-$R^{18}$, linked together, may form a monocyclic ring or polycyclic ring which may have a double bond. Examples of such monocyclic or polycyclic ring may include those exemplified below. These rings may have a substituent such as a methyl group.

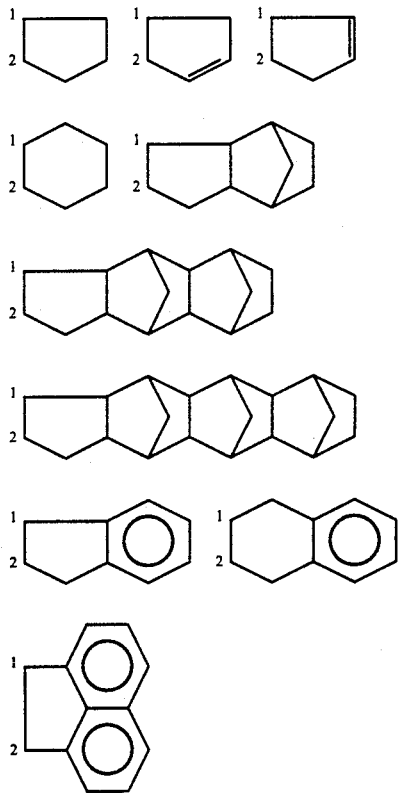

In the formulas exemplified above, carbon atoms indicated by 1 and 2 represent the carbon atoms of the alicyclic structure to which the groups represented by $R^{15}$-$R^{18}$ have been bonded in the formula [I] mentioned above. In the formula [I], $R^{15}$ and $R^{16}$, or $R^{17}$ and $R^{18}$ may together form an alkylidene group. Such alkylidene group as referred to herein include usually those having 2 to 4 carbon atoms, and concrete examples of the alkylidene group may include ethylidene, propylidene, isopropylidene and isobutylidene.

The cycloolefin represented by the formula [I] or [II] mentioned previously may easily be prepared by Diels-Adler Reaction of cyclopentadienes with appropriate olefins or cycloolefins.

Examples of the cycloolefin represented by the aforementioned formula [I] or [II] include, for example, bicyclo[2,2,1]hept-2-ene derivatives,
tetracyclo[4,4,0,1$^{2.5}$,1$^{7.10}$]-3-dodecene derivatives;
hexacyclo[6,6,1,1$^{3.6}$,1$^{10.13}$,0$^{2.7}$,0$^{9.14}$]-4-heptadecene derivatives;
octacyclo[8,8,0,1$^{2.9}$,1$^{4.7}$,1$^{11.18}$,1$^{13.16}$,0$^{3.8}$,0$^{12.17}$]-5docosene derivatives;
pentacyclo[6,6,1,1$^{3.6}$,0$^{2.7}$,0$^{9.14}$]-4-hexadecene derivatives;
heptacyclo-5-eicosene derivatives;
heptacyclo-5-heneicosene derivatives;
tricyclo[4,3,0,1$^{2.5}$]-3-decene derivatives;
tricyclo[4,4,0,1$^{2.5}$]-3-undecene derivatives;
pentacyclo[6,5,1,1$^{3.6}$,0$^{2.7}$,0$^{9.13}$]-4-pentadecene derivatives;
pentacyclopentadecadiene derivatives;
pentacyclo[7,4,0,1$^{2.5}$,0$^{8.13}$,1$^{9.12}$]-3-pentadecene derivatives;
heptacyclo[8,7,0,1$^{3.6}$,1$^{10.17}$,1$^{12.15}$,0$^{11.16}$,0$^{2.7}$]-4-eicosene derivatives;
nonacyclo[10,9,1,1$^{4.7}$,1$^{13.20}$,1$^{15.18}$,0$^{3.8}$,0$^{2.10}$,0$^{12.21}$, 0$^{14.19}$]-5-pentacosene derivatives;
pentacyclo[8,4,0,1$^{2.5}$,1$^{9.12}$,0$^{8.13}$]-3-hexadecene derivatives;
heptacyclo[8,8,0,1$^{4.7}$,1$^{11.18}$,1$^{13.16}$,0$^{3.8}$,0$^{12.17}$]-5-heneicosene derivatives;
nonacyclo[10,10,1,1$^{5.8}$, 1$^{14.21}$,1$^{16.19}$,0$^{2.11}$,0$^{4.9}$,0$^{13.22}$, 0$^{15.20}$]-5-hexacosene derivatives;
5-phenyl-bicyclo[2,2,1]hept-2-ene,
5-methyl-5-phenyl-bicyclo[2,2,1]hept-2-ene,
5-benzyl-bicyclo[2,2,1]hept-2-ene,
5-tolyl-bicyclo[2,2,1]hept-2-ene,
5-(ethylphenyl)-bicyclo[2,2,1]hept-2-ene,
5-(isopropylphenyl)-bicyclo[2,2,1]hept-2-ene,
1,4-methano-1,4,4a,9a-tetrahydrofluorene,
1,4-methano-1,4,4a,5,10,10a-hexahydroanthracene,
cyclopentadiene-acenaphthylene addition product
5-(α-naphthyl)-bicyclo[2,2,1]hept-2-ene, and
5-(anthracenyl)-bicyclo[2,2,1]hept-2-ene.

Examples of the above-mentioned compounds are described below.

Bicyclo[2,2,1]hept-2-ene derivatives such as

bicyclo[2,2,1]hept-2-ene,

6-methylbicyclo[2,2,1]hept-2-ene,

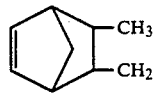

5,6-dimethylbicyclo[2,2,1]hept-2-ene,

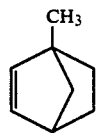

1-methylbicyclo[2,2,1]hept-2-ene,

6-ethylbicyclo[2,2,1]hept-2-ene,

6-n-butylbicyclo[2,2,1]hept-2-ene,

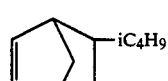

6-isobutylbicyclo[2,2,1]hept-2-ene, and

7-methylbicyclo[2,2,1]hept-2-ene;

Tetracyclo[4,4,0,1$^{2.5}$,1$^{7.10}$]-3-dodecene derivatives such as

tetracyclo[4,4,0,1$^{2.5}$,1$^{7.10}$]-3-dodecene,

8-methyltetracyclo[4,4,0,1$^{2.5}$,1$^{7.10}$]-3-dodecene,

8-ethyltetracyclo[4,4,0,1$^{2.5}$,1$^{7.10}$]-3-dodecene,

8-propyltetracyclo[4,4,0,1$^{2.5}$,1$^{7.10}$]-3-dodecene,

-continued 8-butyltetracyclo[4,4,0,1$^{2.5}$,1$^{7.10}$]-3-dodecene,

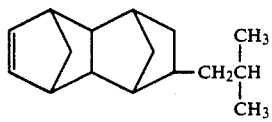

8-isobutyltetracyclo[4,4,0,1$^{2.5}$,1$^{7.10}$]-3-dodecene,

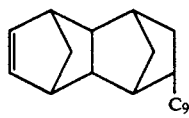

8-hexyltetracyclo[4,4,0,1$^{2.5}$,1$^{7.10}$]-3-dodecene,

8-cyclohexyltetracyclo[4,4,0,1$^{2.5}$,1$^{7.10}$]-3-dodecene,

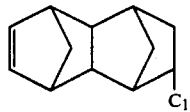

8-stearyltetracyclo[4,4,0,1$^{2.5}$,1$^{7.10}$]-3-dodecene,

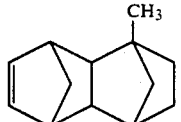

5,10-dimethyltetracyclo[4,4,0,1$^{2.5}$,1$^{7.10}$]-3-dodecene,

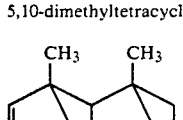

2,10-dimethyltetracyclo[4,4,0,1$^{2.5}$,1$^{7.10}$]-3-dodecene,

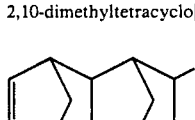

8,9-dimethyltetracyclo[4,4,0,1$^{2.5}$,1$^{7.10}$]-3-dodecene,

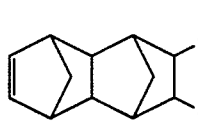

8-ethyl-9-methyltetracyclo[4,4,0,1$^{2.5}$,1$^{7.10}$]-3-dodecene,

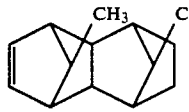

11,12-dimethyltetracyclo[4,4,0,1$^{2.5}$,1$^{7.10}$]-3-dodecene,

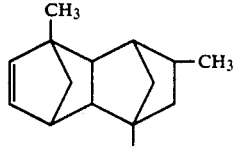

2,7,9-trimethyltetracyclo[4,4,0,1$^{2.5}$,1$^{7.10}$]-3-dodecene,

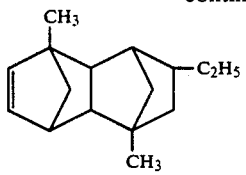

9-ethyl-2,7-dimethyltetracyclo-[4,4,0,1$^{2.5}$,1$^{7.10}$]-3-dodecene,

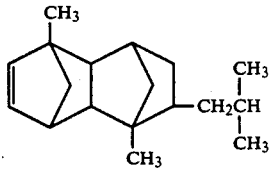

9-isobutyl-2,7-dimethyltetracyclo-[4,4,0,1$^{2.5}$,1$^{7.10}$]-3-dodecene,

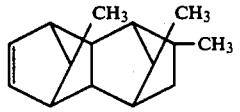

9,11,12-trimethyltetracyclo-[4,4,0,1$^{2.5}$,1$^{7.10}$]-3-dodecene,

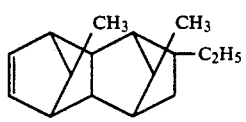

9-ethyl-11,12-dimethyltetracyclo-[4,4,0,1$^{2.5}$,1$^{7.10}$]-3-dodecene,

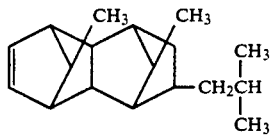

9-isobutyl-11,12-dimethyltetracyclo-[4,4,0,1$^{2.5}$,1$^{7.10}$]-3-dodecene,

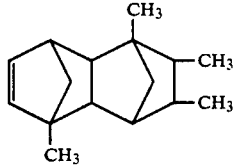

5,8,9,10-tetramethyltetracyclo-[4,4,0,1$^{2.5}$,1$^{7.10}$]-3-dodecene,

8-ethylidenetetracyclo-[4,4,0,1$^{2.5}$,1$^{7.10}$]-3-dodecene,

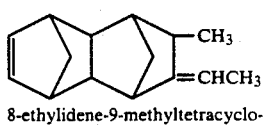

8-ethylidene-9-methyltetracyclo-[4,4,0,1$^{2.5}$,1$^{7.10}$]-3-dodecene,

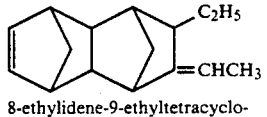

8-ethylidene-9-ethyltetracyclo-[4,4,0,1$^{2.5}$,1$^{7.10}$]-3-dodecene,

-continued

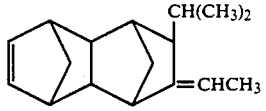
8-ethylidene-9-isopropyltetracyclo-
[4,4,0,1$^{2.5}$,1$^{7.10}$]-3-dodecene,

8-ethylidene-9-butyltetracyclo-
[4,4,0,1$^{2.5}$,1$^{7.10}$]-3-dodecene,

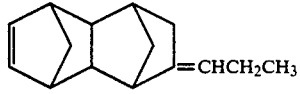
8-n-propylidenetetracyclo-
[4,4,0,1$^{2.5}$,1$^{7.10}$]-3-dodecene,

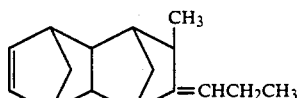
8-n-propylidene-9-methyltetracyclo-
[4,4,0,1$^{2.5}$,1$^{7.10}$]-3-dodecene,

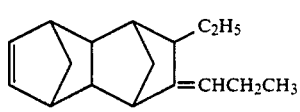
8-n-propylidene-9-ethyltetracyclo-
[4,4,0,1$^{2.5}$,1$^{7.10}$]-3-dodecene,

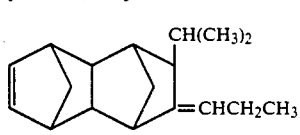
8-n-propylidene-9-isopropyltetracyclo-
[4,4,0,1$^{2.5}$,1$^{7.10}$]-3-dodecene,

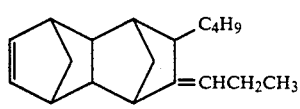
8-n-propylidene-9-butyltetracyclo-
[4,4,0,1$^{2.5}$,1$^{7.10}$]-3-dodecene,

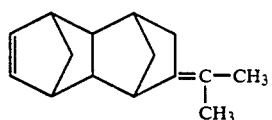
8-isopropylidenetetracyclo-
[4,4,0,1$^{2.5}$,1$^{7.10}$]-3-dodecene,

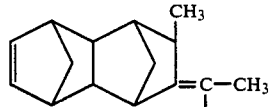
8-isopropylidene-9-methyltetracyclo-
[4,4,0,1$^{2.5}$,1$^{7.10}$]-3-dodecene,

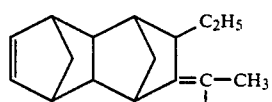
8-isopropylidene-9-ethyltetracyclo-
[4,4,0,1$^{2.5}$,1$^{7.10}$]-3-dodecene, -continued

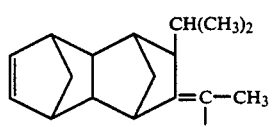
8-isopropylidene-9-isopropyltetracyclo-
[4,4,0,1$^{2.5}$,1$^{7.10}$]-3-dodecene,

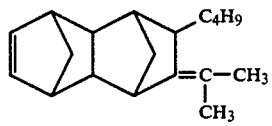
8-isopropylidene-9-butyltetracyclo-
[4,4,0,1$^{2.5}$,1$^{7.10}$]-3-dodecene,

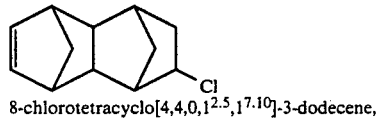
8-chlorotetracyclo[4,4,0,1$^{2.5}$,1$^{7.10}$]-3-dodecene,

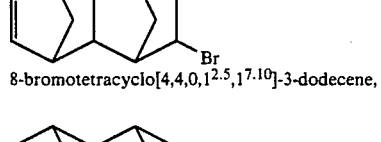
8-bromotetracyclo[4,4,0,1$^{2.5}$,1$^{7.10}$]-3-dodecene,

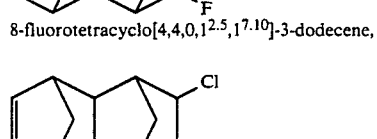
8-fluorotetracyclo[4,4,0,1$^{2.5}$,1$^{7.10}$]-3-dodecene,

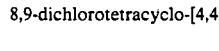
8,9-dichlorotetracyclo-[4,4,0,1$^{2.5}$,1$^{7.10}$]-3-dodecene;

Hexacyclo[6,6,1,1$^{3.6}$,1$^{10.13}$,0$^{2.7}$,0$^{9.14}$]-4-heptadecene
derivatives such as

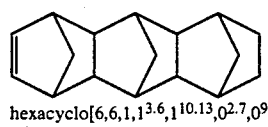
hexacyclo[6,6,1,1$^{3.6}$,1$^{10.13}$,0$^{2.7}$,0$^{9.14}$]-
4-heptadecene,

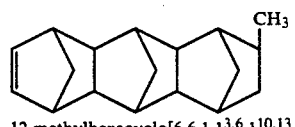
12-methylhexacyclo[6,6,1,1$^{3.6}$,1$^{10.13}$,0$^{2.7}$,0$^{9.14}$]-
4-heptadecene,

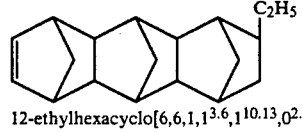
12-ethylhexacyclo[6,6,1,1$^{3.6}$,1$^{10.13}$,0$^{2.7}$,0$^{9.14}$]-
4-heptadecene,

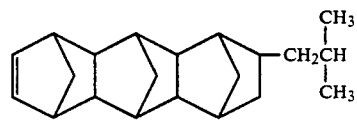

-continued
12-isobutylhexacyclo[6,6,1,1$^{3.6}$,1$^{10.13}$,0$^{2.7}$,0$^{9.14}$]-4-heptadecene,

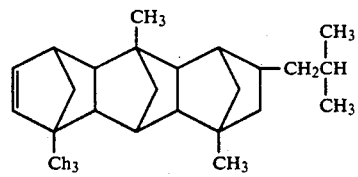

1,6,10-trimethyl-12-isobutylhexacyclo-[6,6,1,1$^{3.6}$,1$^{10.13}$,0$^{2.7}$,0$^{9.14}$]-4-heptadecene;

Octacyclo[8,8,0,1$^{2.9}$,1$^{4.7}$,1$^{11.18}$,1$^{13.16}$,0$^{3.8}$,0$^{12.17}$]-5-docosene derivatives such as

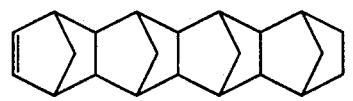

octacyclo[8,8,0,1$^{2.9}$,1$^{4.7}$,1$^{11.18}$,1$^{13.16}$,0$^{3.8}$,0$^{12.17}$]-5-docosene,

15-methyloctacyclo[8,8,0,1$^{2.9}$,1$^{4.7}$,1$^{11.18}$,1$^{13.16}$,0$^{3.8}$,0$^{12.17}$]-5-docosene,

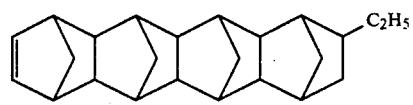

15-ethyloctacyclo[8,8,0,1$^{2.9}$,1$^{4.7}$,1$^{11.18}$,1$^{13.16}$,0$^{3.8}$,0$^{12.17}$]-5-docosene;

Pentacyclo[6,6,1,1$^{3.6}$,0$^{2.7}$,0$^{9.14}$]-4-hexadecene derivatives such as

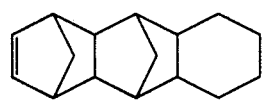

pentacyclo[6,6,1,1$^{3.6}$,0$^{2.7}$,0$^{9.14}$]-4-hexadecene,

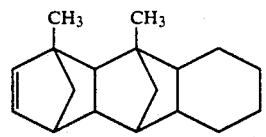

1,3-dimethylpentacyclo[6,6,1,1$^{3.6}$,0$^{2.7}$,0$^{9.14}$]-4-hexadecene,

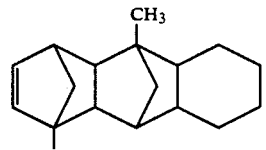

1,6-dimethylpentacyclo[6,6,1,1$^{3.6}$,0$^{2.7}$,0$^{9.14}$]-4-hexadecene,

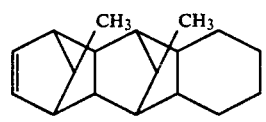

15,16-dimethylpentacyclo[6,6,1,1$^{3.6}$,0$^{2.7}$,0$^{9.14}$]-4-hexadecene;

Heptacyclo-5-icosene derivatives or heptacyclo-5-heneicosene derivatives such as

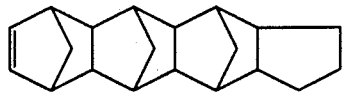

heptacyclo[8,7,0,1$^{2.9}$,1$^{4.7}$,1$^{11.17}$,0$^{3.8}$,0$^{12.16}$]-5-icosene,

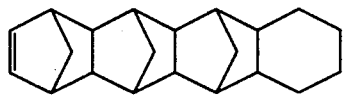

heptacyclo[8,8,0,1$^{2.9}$,1$^{4.7}$,1$^{11.18}$,0$^{3.8}$,0$^{12.17}$]-5-heneicosene;

Tricyclo[4,3,0,1$^{2.5}$]-3-decene derivatives such as

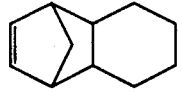

tricyclo[4,3,0,1$^{2.5}$]-3-decene,

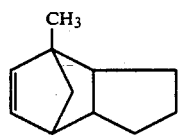

2-methyltricyclo[4,3,0,1$^{2.5}$]-3-decene,

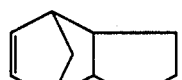

5-methyltricyclo[4,3,0,1$^{2.5}$]-3-decene;

Tricyclo[4,4,0,1$^{2.5}$]-3-undecene derivatives such as

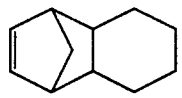

tricyclo[4,4,0,1$^{2.5}$]-3-undecene,

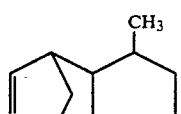

10-methyltricyclo[4,4,0,1$^{2.5}$]-3-undecene;

Pentacyclo[6,5,1,1$^{3.6}$,0$^{2.7}$,0$^{9.13}$]-4-pentadecene derivatives such as

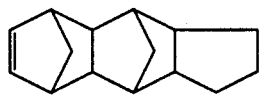

pentacyclo[6,5,1,1$^{3.6}$,0$^{2.7}$,0$^{9.13}$]-4-pentadecene,

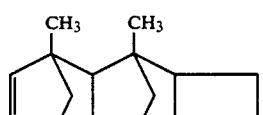

1,3-dimethylpentacyclo[6,5,1,1$^{3.6}$,0$^{2.7}$,0$^{9.13}$]-4-pentadecene,

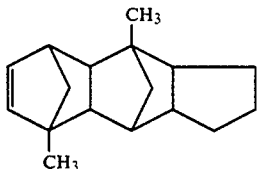

1,6-dimethylpentacyclo[6,5,1,1$^{3.6}$,0$^{2.7}$,0$^{9.13}$]-4-pentadecene,

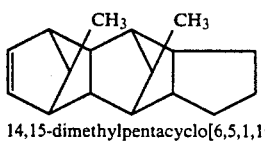

14,15-dimethylpentacyclo[6,5,1,1$^{3.6}$,0$^{2.7}$,0$^{9.13}$]-4-pentadecene;

Diene compounds such as

pentacyclo[6,5,1,1$^{3.6}$,0$^{2.7}$,0$^{9.13}$]-4,10-pentadecadiene;

Pentacyclo[7,4,0,1$^{2.5}$,0$^{8.13}$,1$^{9.12}$]-3-pentadecene derivatives such as

pentacyclo[7,4,0,1$^{2.5}$,1$^{9.12}$,0$^{8.13}$]-3-pentadecene,

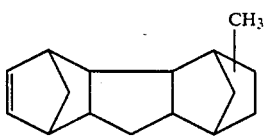

methyl-substituted pentacyclo[7,4,0,1$^{2.5}$,1$^{9.12}$,0$^{8.13}$]-3-pentadecene;

Heptacyclo[8,7,0,1$^{3.6}$,1$^{10.17}$,1$^{12.15}$,0$^{2.7}$,0$^{11.16}$]-4-eicosene derivatives such as

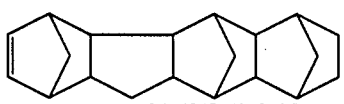

heptacyclo[8,7,0,1$^{3.6}$,1$^{10.17}$,1$^{12.15}$,0$^{2.7}$,0$^{11.16}$]-4-eicosene,

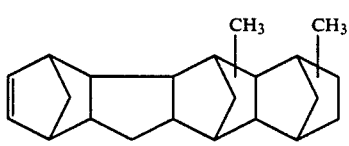

dimethyl-substituted heptacyclo-[8,7,0,1$^{3.6}$,1$^{10.17}$,1$^{12.15}$,0$^{2.7}$,0$^{11.16}$]-4-eicosene;

Nonacyclo[10,9,1,1$^{4.7}$,1$^{13.20}$,1$^{15.18}$,0$^{3.8}$,0$^{2.10}$,0$^{12.21}$,0$^{14.19}$]-5-pentacosene derivatives such as

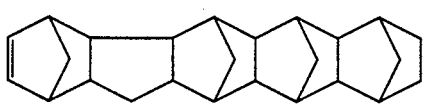

nonacyclo-[10,9,1,1$^{4.7}$,1$^{13.20}$,1$^{15.18}$,0$^{3.8}$,0$^{2.10}$,0$^{12.21}$,0$^{14.19}$]-5-pentacosene.

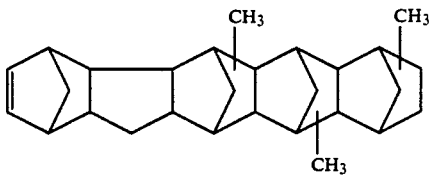

trimethyl-substituted nonacyclo-[10,9,1,1$^{4.7}$,1$^{13.20}$,1$^{15.18}$,0$^{3.8}$,0$^{2.10}$,0$^{12.21}$,0$^{14.19}$]-5-pentacosene;

Pentacyclo [8,4,0,1$^{2.5}$,1$^{9.12}$,0$^{8.13}$]-3-hexadecene derivatives such as

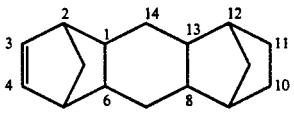

Pentacyclo[8,4,0,1$^{2.5}$,1$^{9.12}$,0$^{8.13}$]-3-hexadecene

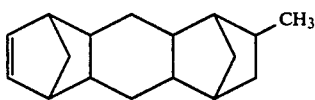

11-Methylpentacyclo[8,4,0,1$^{2.5}$,1$^{2.5}$,1$^{9.12}$,0$^{8.13}$]-3-hexadecene

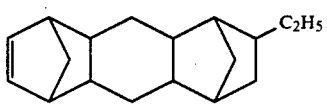

11-Ethylpentacyclo[8,4,0,1$^{2.5}$,1$^{9.12}$,0$^{8.13}$]-3-hexadecene

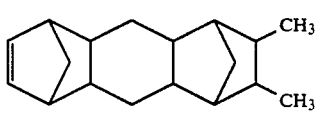

10,11-Dimethylpentacyclo[8,4,0,1$^{2.5}$,1$^{9.12}$,0$^{8.13}$]-3-hexadecene;

Heptacyclo[8,8,0,1$^{4.7}$,1$^{11.18}$,1$^{13.16}$,0$^{3.8}$,0$^{12.17}$]-5-heneicosene derivatives such as

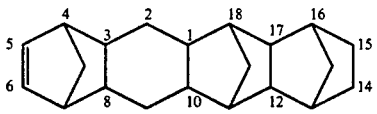

Heptacyclo[8,8,0,1$^{4.7}$,1$^{11.18}$,1$^{13.16}$,0$^{3.8}$,0$^{12.17}$]-5-heneicosene

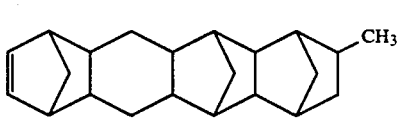

15-Methylheptacyclo[8,8,0,1$^{4.7}$,1$^{11.18}$,1$^{13.16}$,0$^{3.8}$,0$^{12.17}$]-5-heneicosene

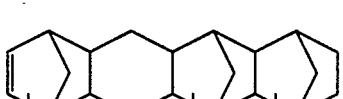

Trimethyl-substituted heptacyclo [8.8.0.1$^{4.7}$,1$^{11.18}$,1$^{13.16}$,0$^{3.8}$,0$^{12.17}$]-5-heneicosene Nonacyclo[10,10,1,1^{5.8},1^{14.21},1^{16.19},0^{2.11},0^{4.9},0^{13.22},0^{15.20}]-6-hexacosene derivatives such as

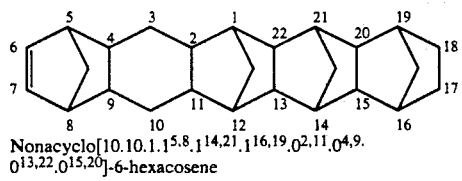
Nonacyclo[10.10.1.1^{5.8},1^{14.21},1^{16.19},0^{2.11},0^{4.9},0^{13.22},0^{15.20}]-6-hexacosene Furthermore, such compounds as listed below.

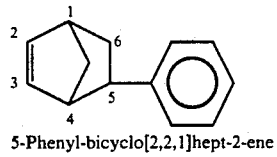
5-Phenyl-bicyclo[2,2,1]hept-2-ene

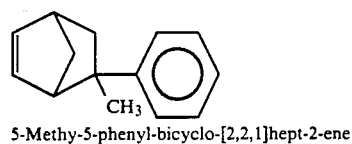
5-Methy-5-phenyl-bicyclo-[2,2,1]hept-2-ene

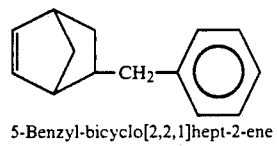
5-Benzyl-bicyclo[2,2,1]hept-2-ene

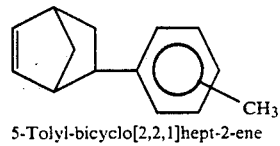
5-Tolyl-bicyclo[2,2,1]hept-2-ene

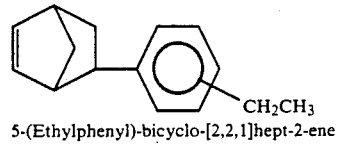
5-(Ethylphenyl)-bicyclo-[2,2,1]hept-2-ene

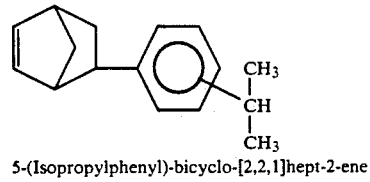
5-(Isopropylphenyl)-bicyclo-[2,2,1]hept-2-ene

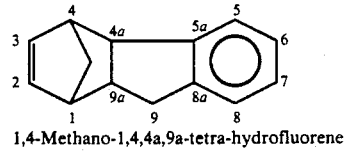
1,4-Methano-1,4,4a,9a-tetra-hydrofluorene

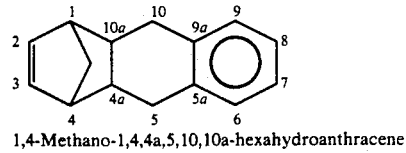
1,4-Methano-1,4,4a,5,10,10a-hexahydroanthracene

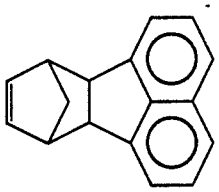
Cyclopentadiene-acenaphthylene addition product

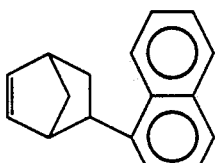
5-(α-Naphthyl)-bicyclo[2,2,1]-hept-2-ene

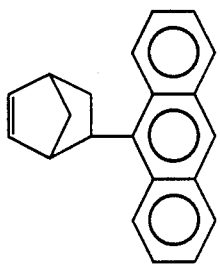
5-(Anthracenyl)-bicyclo[2,2,1]-hept-2-ene

The cycloolefin random copolymers used in the present invention may be prepared by copolymerization of ethylene and specific cycloolefins exemplified above used, either singly or in combination.

Cycloolefin random copolymers are obtained, for example, by polymerization of ethylene and the above-exemplified cycloolefins in a hydrocarbon medium in the presence of a catalyst formed from a hydrocarbon-soluble vanadium compound and a halogen containing organoaluminum compound. Such polymerization technique as mentioned above is already well known, and is disclosed in Japanese Patent L-O-P No. 168708/1985 or the like.

The cycloolefin random copolymers comprising the above-exemplified cycloolefins and ethylene as essential ingredients thereof may further contain, if necessary, other unsaturated monomer compounds copolymerizable with ethylene and the cycloolefins in such an amount that the monomer components added do not obstruct the attainment of the objects of the invention. The other unsaturated monomers that may be optionally copolymerized with ethylene and the cycloolefins mentioned above include concretely α-olefins having 3 to 20 carbon atoms, such as propylene, 1-butene, 4-methyl-1-pentene, 1-hexane, 1-octene, 1-decene, 1-dodecene, 1-tetradecene, 1-hexadecene, 1-octadecene and 1-eicosene, the amount of said α-olefins used being less than equimolar with the ethylene component units present in the resulting random copolymer.

Further, in preparing the cycloolefin random copolymers used in the invention as mentioned above, it is also possible to carry out copolymerization of ethylene with cycloolefins other than those represented by the formula [I] or [II] so long as said cycloolefins do not mar physical properties of the resulting copolymers. Such cycloolefins as may be used herein include, for example, cyclobutene, cyclopentene, cyclohexene, 3,4-dimethylcyclohexene, 3-methylcyclohexene, 2-(2-methylbutyl)-1-cyclohexene, 3a,5,6,7a-tetrahydro-4,7-methano-1H-indene, etc. These other cycloolefins may be used singly or in combination, and they are used in an amount of usually 0 to 50 mol % of the cycloolefin represented by the above-mentioned formula [I] or [II].

The cycloolefin random copolymers as mentioned above may be prepared according to the processes proposed by the present applicant in Japanese Patent L-O-P Nos. 168708/1985, 120816/1986, 115912/1986, 115916/1986, 271308/1986, 272216/1986, 252406/1987 and 252407/1987, by suitably selecting the conditions under which copolymerization of ethylene and cycloolefins are carried out.

More particularly, the above-mentioned cycloolefin random copolymers may be obtained by carrying out copolymerization of ethylene and tetracyclo[4,4,0,1$^{2.5}$,1$^{7.10}$]-3-dodecene (hereinafter abbreviated sometimes to TCD-3) used as the cycloolefin in a cyclohexane medium using a continuous polymerizer in the presence of VO(OCH$_2$CH$_3$)Cl$_2$/Al(CH$_2$CH$_3$)$_{1.5}$Cl$_{1.5}$ as a catalyst at a reaction temperature of 10° C. and for a reaction time (average retention time of polymerization reaction) of 30 minutes.

In the ethylene/cycloolefin random copolymers thus obtained, it is considered that the structural units derived from the cycloolefin represented by the aforementioned formula [I] or [II] have formed recurring units represented by the following formula [III] or [IV].

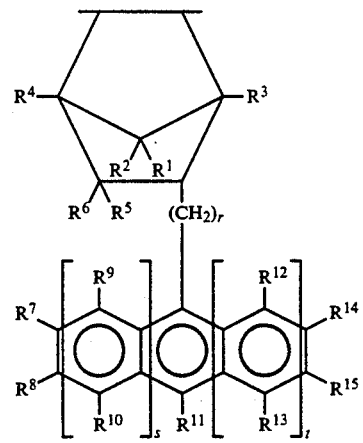

wherein r, s, t, and $R^1$-$R^{15}$ are each as defined in the aforementioned formula [II].

In the present invention, there may also be used, in addition to the above-mentioned cycloolefin random copolymers, polymers or copolymers obtained by ring opening the same or different cycloolefin monomers or hydrogenation products thereof. It is considered in this connection that such cycloolefin ring opening polymers, ring opening copolymers or hydrogenation products thereof are formed, for example, from the cycloolefins represented by the aforementioned formula [I],

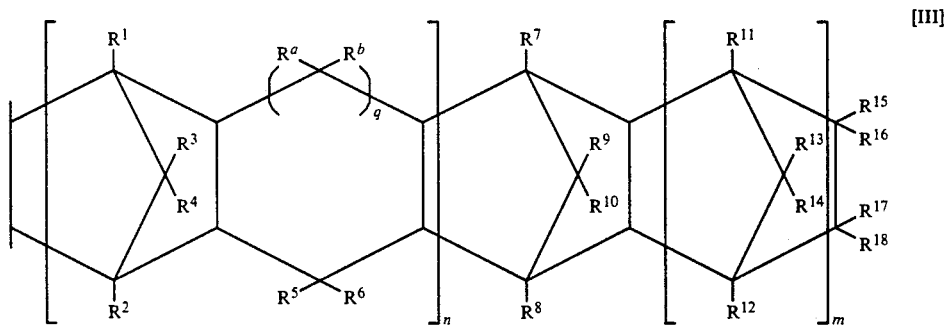

wherein m, n, q, $R^1$-$R^{18}$, $R^a$ and $R^b$ are each as defined in the aforementioned formula [I].

taken as an example of the above-mentioned cycloolefin monomers, when said cycloolefins of the formula [I] undergo ring opening and hydrogenation reaction in the following manner.

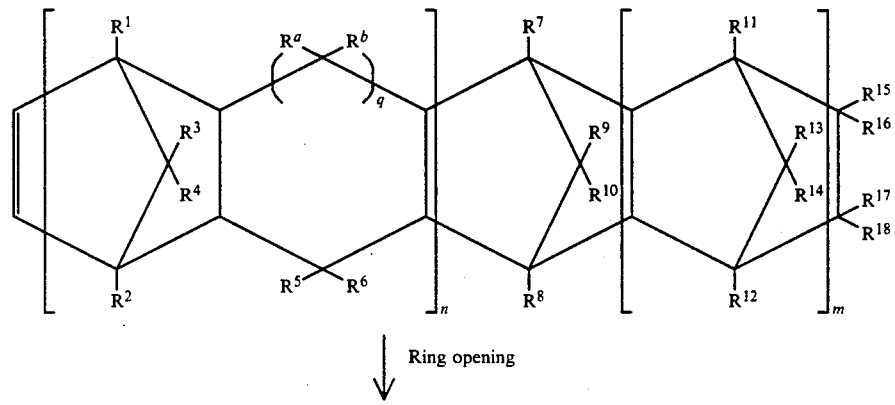

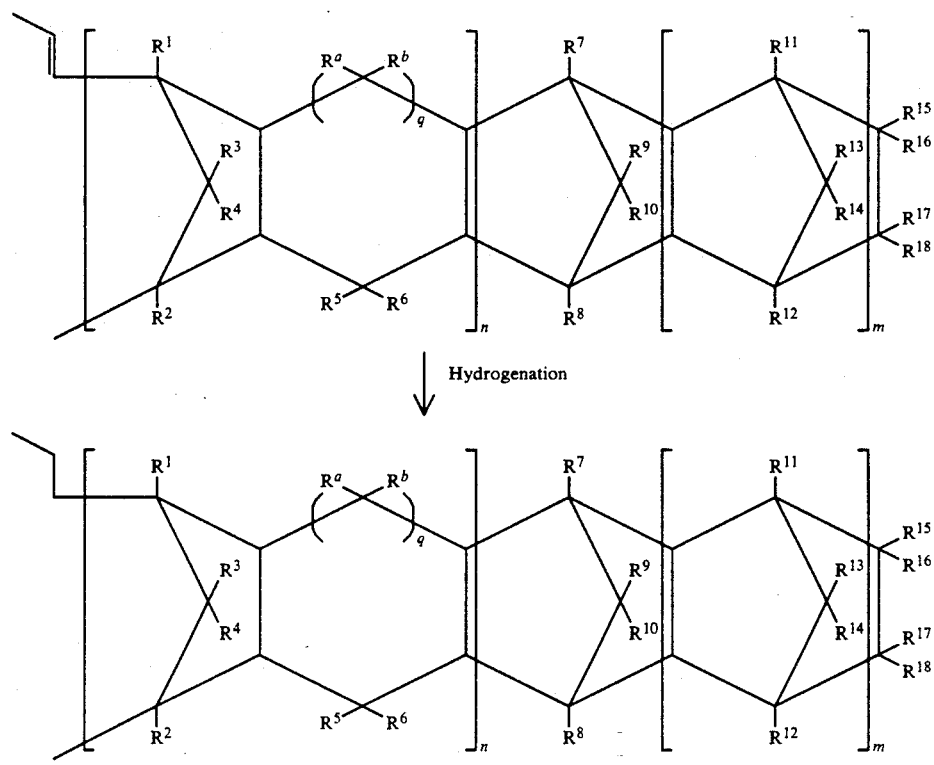

Examples of such polymers obtained by the above-mentioned procedure include, for example, ring opening copolymers of tetracyclododecene and norbornene, and of derivatives thereof, and hydrogenation products of these ring opening copolymers.

In the present invention, the above-mentioned ring opening polymers, ring opening copolymers and hydrogenation products thereof, and the cycloolefin random copolymers mentioned previously (hereinafter called generically "the cycloolefin resin") may partly be modified with unsaturated carboxylic acids such as maleic anhydride. These modification products may be prepared by reaction of the above-mentioned cycloolefin resin with unsaturated carboxylic acids, anhydrides thereof or derivatives thereof such as alkyl esters of said unsaturated carboxylic acids. In this case, the content of the structural units derived from the modifier in the modified cycloolefin resin is usually not more than 10 wt %. Such modification products of the cycloolefin resin as mentioned above may be prepared by mixing the cycloolefin resin with the above-mentioned modifier so as to obtain a desired percentage of modification, and allowing the mixture to undergo graft polymerization, or may be prepared by preparing in advance the modification products having a high percentage of modification, and mixture said modification products with an unmodified cycloolefin resin.

In the present invention, the above-mentioned ring opening polymers, ring opening copolymers, hydrogenation products thereof, cycloolefin random copolymers and modification products thereof may be used either singly or in combination.

The cycloolefin random copolymer compositions of the invention are designed to contain at least two kinds of such cycloolefin resins as mentioned above.

In the first cycloolefin random copolymer compositions of the invention, there may be used, as the above-mentioned cycloolefin resins, cycloolefin random copolymers having an intrinsic viscosity [η] of more than 0.10 dl/g, and the Mw/Mn ratio of a weight average molecular weight (Mw) to a number average molecular weight (Mn), as measured by GPC, of not more than 4.

The cycloolefin copolymers contain the recurring units derived from ethylene in an amount of 40-90 mol %, preferably 50-85 mol %, and the recurring units derived from said cycloolefin in an amount of 10-60 mol %, preferably 15-50 mol %. The recurring units derived from ethylene and those derived from the cycloolefin are substancially arranged at random and linearly. The ethylene composition and the cycloolefin composition were measured by $^{13}$C-NMR. That the above-mentioned cycloolefin random copolymers are substantially linear and have no gel-like crosslinked structure may be confirmed by the fact that said copolymers dissolve completely in decalin at 135° C.

These cycloolefin copolymers have an intrinsic viscosity [η], as measured in decalin at 135° C., of more than 0.10 dl/g as mentioned above, preferably 0.15-2.0 dl/g and especially 0.15-1.5 dl/g, and also have the Mw/Mn ratio of a weight average molecular weight (Mw) to a number average molecular weight (Mn), as measured by GPC, of mot more than 4, preferably not more than 3.5 and especially 1.9 to 3.3.

The above-mentioned cycloolefin copolymers have a softening temperature (TMA), as measured by a thermal mechanical analyzer, of more than 70° C., preferably 80°-250° C. and especially 90°-200° C. The softening temperature (TMA) was determined in terms of behavior of thermal deformation of a sheet of the copolymer having a thickness of 1 mm using a thermo mechanical analyzer manufactured and sold by Du Pont Co. That is, a quartz needle is placed on the sheet, while applying a load of 49 g and elevating the temperature at a rate of 5° C./min, and the elevated temperature at which the needle has penetrated through the plate to a depth of 0.635 mm was taken as TMA. It is desirable that these cycloolefin copolymers have a glass transition temperature (Tg) of usually 60°–240° C., preferably 70°–200° C.

The cycloolefin copolymers mentioned above have a crystallinity index, as measured by X-ray diffraction, of 0–10%, preferably 0–7% and especially 0–5%.

In the present invention, it is particularly desirable that the above-mentioned cycloolefin random copolymers classified into two groups, that is, one group includes the copolymers having an intrinsic viscosity of not more than 0.45 dl/g and the other group including the copolymers having an intrinsic viscosity of more than 0.45 dl/g, are used in combination so that the resulting composition will have an intrinsic viscosity as defined in the present invention.

Illustrated below is the process for preparing the first cycloolefin random copolymer compositions of the present invention containing two kinds of cycloolefin copolymers. Of the two kinds of the copolymers contained in the composition, one having a higher intrinsic viscosity $[\eta]$ is called (A), and the other having a lower intrinsic viscosity $[\eta]$ is called (B).

The cycloolefin copolymer (A) mentioned above has an intrinsic viscosity of usually more than 0.45 dl/g, preferably 0.45 to 2.0 dl/g, and the cycloolefin copolymer (B) has an intrinsic viscosity of usually more than 0.1 dl/g but less than 0.45 dl/g, preferably 0.15 to 0.43 dl/g. The combination use of at least one of the above-mentioned copolymers (A) and (B) in the above-mentioned process results in a resin composition having characteristics suitable particularly for substrates for information recording media or optical materials.

The first cycloolefin random copolymer compositions of the invention contain at least two kinds of the above-mentioned cycloolefin copolymers. Such cycloolefin random copolymer compositions as mentioned above, for example, those containing two kinds of the above-mentioned copolymers, may be prepared by mixing the highly viscous cycloolefin copolymers (A) with the low viscous cycloolefin copolymers (B) according to various procedures. For example, a cycloolefin copolymer composition improved in uniformity may be prepared by mixing together the highly viscous cycloolefin copolymer (A) and low viscous cycloolefin copolymer (B) which have been dissolved separately in good solvent such as cyclohexane, and then pouring the resulting mixed polymer solution into a poor solvent such as acetone to deposit a polymer composition, followed by pelletization.

The cycloolefin random copolymer compositions of the invention may also be prepared by a so-called multi-stage polymerization through one continuous process. When the multi-stage polymerization is adopted, the highly viscous cycloolefin copolymer (A) and low viscous cycloolefin copolymer (B) are prepared individually by separate reactors, and the copolymers (A) and (B) thus prepared are mixed together to obtain a cycloolefin random copolymer composition of the invention. Alternatively, the cycloolefin random copolymer composition of the invention may also be prepared, for example, by carrying out a first polymerization process wherein a low viscous cycloolefin resin (B) is prepared by copolymerization in a cyclohexane solvent of ethylene and TCD-3 as a cycloolefin in the presence of VO-(OCH$_2$CH$_3$)Cl$_2$/Al(CH$_2$CH$_3$)$_{1.5}$Cl$_{1.5}$ as a catalyst at 10° C. and a reaction time (retention time of continues polymerization) of 30 minutes and using H$_2$ in an amount larger than that used in a second polymerization process subsequent thereto, and carrying out the second polymerization process wherein a highly viscous cycloolefin resin (A) is prepared in the presence of the low viscous cycloolefin resin (B), while transferring the polymer solution (containing the resin (B), and unreacted ethylene and cycloolefin) to the second polymerization process, by copolymerization in a cyclohexane solvent of ethylene and TCD-3 in the presence of the same catalyst as used in the first polymerization process at a reaction temperature of 10° C. and a reaction time (retention time) of 30 minutes and using H$_2$ in an amount smaller than that used in the first polymerization process.

The cycloolefin random copolymer compositions prepared in the manner as mentioned above have an intrinsic viscosity $[\eta]$, as measured in decalin at 135° C., of 0.2–0.7 dl/g, preferably 0.3–0.6 dl/g, and the Mw/Mn ratio of a weight average molecular weight (Mw) to a number average molecular weight (Mn) is more than 3, preferably 3.2 to 50 and especially 3.4 to 30. The value of the Mw/Mn ratio of the weight average molecular weight (Mw) to the number average molecular weight (Mn) is determined by a gel permeation chromatography (GPC). When the cycloolefin random copolymer compositions having an intrinsic viscosity $[\eta]$ and the Mw/Mn ratio as defined above are molded, for example, into optical instrument parts, there are obtained improved moldability and transferability of recorded information.

The second cycloolefin random copolymer compositions of the invention are illustrated hereinafter.

The second cycloolefin random copolymer compositions of the invention contain at least two kinds of cycloolefin random copolymers. No particular limit is placed upon physical properties of the cycloolefin random copolymers used in the second resin compositions of the invention, and various cycloolefin random copolymers may be used in combination so long as the resulting cycloolefin random copolymer composition will satisfy physical properties as will be mentioned later. It is desirable, however, to use the cycloolefin random copolymers having an intrinsic viscosity $[\eta]$, as measured in decalin at 135° C., of 0.1–5 dl/g, preferably 0.1–3 dl/g, a softening temperature (TMA) of 70°–250° C., preferably 80°–200° C. and especially 90°–180° C., a glass transition temperature (Tg) of usually 60°–230° C., preferably 70°–190° C., and a crystallinity index, as measured by X-ray diffractometry, of 0–10%, preferably 0–7% and especially 0–5%.

The cycloolefin random copolymers as mentioned above contain 40–90 mol %, preferably 50–85 mol % of recurring units derived from ethylene, and 10–60 mol %, preferably 15–50 mol % of recurring units derived from cycloolefin. The recurring units derived from ethylene and those derived from cycloolefin are substancially arranged at random and linearly.

The second cycloolefin random copolymer compositions of the invention contain at least two kinds of cycloolefin random copolymers as illustrated above. The cycloolefin random copolymer compositions mentioned above may be prepared according to various methods by mixing a plurality of the cycloolefin random copolymers in combination. For example, a cycloolefin random copolymer composition improved in uniformity may be prepared by mixing together two or more cycloolefin random copolymers dissolved individually in a good solvent such as cyclohexane, and then pouring the resulting mixed polymer solution into a poor solvent such as acetone to deposit a polymer composition, followed by pelletization of the polymer composition.

The cycloolefin random copolymer compositions of the invention may also be prepared by a so-called multi-stage polymerization through one continuous process. When the multi-stage polymerization is adopted, two or more of ethylene/cycloolefin copolymers different in composition are prepared individually by separate reactors, and the thus prepared copolymers are mixed together to obtain a cycloolefin random copolymer composition of the invention. Alternatively, the second cycloolefin random copolymer composition of the invention may also be prepared, for example, by carrying out a first polymerization process wherein a copolymer having a high cycloolefin content is prepared by copolymerization in a cyclohexane solvent of ethylene and TCD-3 as a cycloolefin in the presence of VO-$(OCH_2CH_3)Cl_2/Al(CH_2CH_3)_{1.5}Cl_{1.5}$ as a catalyst at a reaction temperature of 10° C. and a reaction time of 30 minutes, while using the ethylene/TCD-3 feed ratio smaller than that used in a second polymerization process subsequent thereto, and then carrying out the second polymerization process wherein a copolymer having a low cycloolefin content is prepared in the presence of the copolymer having a high cycloolefin content, while transferring the polymer solution (containing the copolymer having a high cycloolefin content, and unreacted ethylene and cycloolefin) to the second polymerization process, by copolymerization of ethylene and TCD-3 in the presence of the same catalyst as used in the first polymerization process at a reaction temperature of 10° C. and a reaction time of 30 minutes while using the ethylene/TCD-3 feed ratio larger than that used in the first polymerization process.

The second cycloolefin random copolymer compositions of the invention having at least two cycloolefin random copolymers as mentioned above have an intrinsic viscosity [η], as measured in decalin at 135° C., of 0.01-5 dl/g, preferably, 0.1-3 dl/g and especially 0.2-2.5 dl/g, a softening temperature (TMA) of 70°-250° C., preferably 80°-200° C. and especially 90°-180° C., a glass transition temperature (Tg) of usually 60°-230° C., preferably 70°-190° C., and a crystallinity index, as measured by X-ray diffractometry, of 0-10%, preferably 0-7% and especially 0-5%.

The second cycloolefin random copolymer compositions of the invention as illustrated above contain 10-60 mol %, preferably 15-50 mol % of recurring units derived from the above-mentioned cycloolefin, and 40-90 mol %, preferably 50-85 mol % of recurring units derived from ethylene.

In the second cycloolefin random copolymer compositions of the invention, the Cw/Cn ratio of a weight average molecular weight (Cw) defined by the following formula (1) to a number average molecular weight (Cn) defined by the following formula (2) satisfies a specific requirement.

$$Cw = \sum_{i=1}^{m} C_i W_i \quad (1)$$

$$Cn = 1 / \sum_{i=1}^{m} (W_i/C_i) \quad (2)$$

In the formulas (1) and (2) mentioned above, m is a number of cycloolefin random copolymer component constituting the cycloolefin random copolymer composition, said number being at least 2, preferably an integer of 2 to 5, Ci represents the cycloolefin content (mol %) of the cycloolefin random copolymer component i (hereinafter called i component) present in the composition, and Wi represents a weight fraction of the i component present in the composition.

In the second composition of the invention, the above-mentioned Cw/Cn ratio is at least 1.04, preferably 1.045 to 2.0 and especially 1.05 to 1.3. When the compositions having the Cw/Cn ratio as defined above are molded, for example, into optical instrument parts, there are obtained improved moldability and transferability of recorded information.

In the second compositions of the invention, there may also be used, in addition to the above-mentioned cycloolefin random copolymers, polymers or copolymers obtained by ring opening the same or different cycloolefin monomers, or hydrogenation products thereof. When a hydrogenation product of the above-mentioned ring opening polymers is used in the second composition of the invention, the above-mentioned Ci in said hydrogenation product signifies the content (mol %) of the most bulky cycloolefin unit contained in the i component of said polymers.

The third cycloolefin random copolymer compositions of the invention are illustrated hereinafter.

The third cycloolefin random copolymer compositions of the invention contain at least three kinds of cycloolefin random copolymers.

The cycloolefin random copolymers constituting the third compositions of the invention contain 40-95 mol %, preferably 50-90 mol % of recurring units derived from ethylene, and 5-60 mol %, preferably 10-50 mol % of recurring units derived from cycloolefin. The recurring units derived from the ethylene and cycloolefin are arranged at random and linearly in substance.

The cycloolefin random copolymers mentioned above have an intrinsic viscosity [η], as measured in decalin at 135° C., of 0.01-5 dl/g, preferably 0.1-3 dl/g and especially 0.2-2.5 dl/g, a glass transition temperature (Tg) of usually −30° to 230° C., preferably −10° to 200° C., and a crystallinity index, as measured by X-ray diffractometry, of 0-10%, preferably 0-7% and especially 0-5%.

The third cycloolefin random copolymer compositions of the invention contain at least three kinds of cycloolefin random copolymers having the physical properties as defined above and have a softening temperature of at least 70° C.

When cycloolefin random copolymer components constituting the third compositions of the invention are taken as $S_1, S_2 \ldots S_i \ldots S_n$ (n is an integer of at least 3) and a softening temperature (TMA) of each component $(S_i)$ is taken as $T_i$ (°C.) (i is an integer of 1 to n), $T_i$ satisfies the following formula (3).

$$T_i < T_{i+1} \quad (3)$$

wherein i is an integer of 1 to n−1, preferably $$T_i + 5 < T_{i+1} < T_i + 70 \quad (3')$$

and especially $$T_i + 5 < T_{i+1} < T_i + 50 \quad (3'')$$

That is, it is desirable that in the components $S_i$ and $S_{i+1}$ adjacent to each other, the softening temperature of the component $S_i$ is lower than that of the component $S_{i+1}$ and moreover the difference in softening temperature between components is specific as defined above. Further, the softening temperature $T_1$ of the component $S_1$ having the lowest softening temperature is less than 70° C. (formula (4)).

$$T_1 < 70 \,(°C.) \tag{4}$$

When a weight percentage of the component ($S_i$) constituting the third compositions of the invention is taken as $W_i$ (i is an integer of 1 to n), $W_i$ satisfies the following formula (5).

$$0.01 \leq W_i / \sum_{i=1}^{n} W_i \leq 0.99 \text{ preferably} \tag{5}$$

$$0.02 \leq W_i / \sum_{i=1}^{n} W_i \leq 0.94 \text{ and especially} \tag{5'}$$

$$0.03 \leq W_i / \sum_{i=1}^{n} W_i \leq 0.90 \tag{5''}$$

Moreover, the two-components compositions, containing the components $S_i$ and $S_{i+1}$ having the softening temperatures (TMA) near to each other and blended in the ratio of $W_i:W_{i+1}$ by weight, has a haze of not more than 7.0%, preferably 0.1 to 6.5% and especially 0.1 to 5.5%. Further, the sum total of the components having a softening temperature of less than 70° C. is more than 10 wt % of the whole composition.

The cycloolefin random copolymer compositions of the invention as illustrated above are composed of the cycloolefin random copolymers satisfying the above-mentioned specific requisites, and hence they are excellent in such characteristics as heat resistance, thermal aging resistance, mechanical characteristics, chemical resistance, solvent resistance and dielectric characteristics and, moreover, they are capable of giving molded articles excellent in moldability and transferability of recorded information and also excellent in adhesion to information recording films.

The cycloolefin random copolymer compositions as illustrated above may be prepared according to various methods by mixing together a plurality of cycloolefin random copolymers. For example, there may be obtained the compositions improved in uniformity by dissolving at least three kinds of cycloolefin random copolymers individually in a good solvent such as cyclohexane, mixing together the resulting polymer solutions to obtain a mixed polymer solution, and pouring the mixed polymer solution in a poor solvent such as acetone to deposit a polymer composition, followed by pelletization of the polymer composition.

Alternatively, the third cycloolefin random copolymer compositions of the invention can also be prepared according to a so-called multi-stage polymerization through one continuous process. When the multi-stage polymerization process is adopted, the third cycloolefin random copolymer compositions of the invention may be obtained by preparing at least three kinds of ethylene/cycloolefin copolymers satisfying the above-mentioned requisites of the formulas (3) to (5) and having different TMA by means of separate reactors, and then mixing the thus prepared copolymers together by means of one process. Alternatively, this third composition of the invention may also be prepared, for example, by carrying out a first polymerization process wherein a copolymer having a TMA higher than those of copolymers individually obtained in the following second and third processes subsequent thereto is prepared by copolymerization in a cyclohexane solvent of ethylene and TCD-3 as a cycloolefin in the presence of VO(OCH$_2$CH$_3$)Cl$_2$/Al (CH$_2$CH$_3$)$_{1.5}$Cl$_{1.5}$ as a catalyst at a reaction temperature of 10° C. and a reaction time of 30 minutes, while using the ethylene/TCD-3 feed ratio smaller than those used in the following second and third processes, carrying out the second polymerization process wherein a copolymer having a TMA lower than that of the copolymer obtained in the first process but higher than that of a copolymer obtained in the third process is prepared in the presence of the copolymer obtained in the first process, while transferring the polymer solution (containing the copolymer, and unreacted ethylene and cycloolefin) obtained in the first process to the second polymerization process, by copolymerization in a cyclohexane solvent of ethylene and TCD-3 at a reaction temperature of 10° C. and a reaction time of 30 minutes while using the ethylene/TCD-3 feed ratio larger than that used in the first process, and then carrying out the third polymerization process wherein a copolymer having a TMA lower than that of the copolymer obtained in the second process in the presence of the copolymers obtained respectively in the first and second processes, while transferring the polymer solution obtained in the second process and unreacted ethylene and cycloolefin to the third polymerization process, by copolymerization in a cyclohexane solvent of ethylene and TCD-3 in the presence of the same catalyst as used in the first process at a reaction temperature of 10° C. and a reaction time of 30 minutes while using the ethylene/TCD-3 feed ratio smaller than that used in the second process.

The cycloolefin random copolymer compositions prepared in the manner as mentioned above have an intrinsic viscosity [η], as measured in decalin at 135° C., of 0.01–5 dl/g, preferably 0.1–3 dl/g and especially 0.2–2.5 dl/g, a glass transition temperature (Tg) of usually 60°–240° C., preferably 80°–170° C., a crystallinity index, as measured by X-ray diffractometry, of 0–10%, preferably 0–7% and especially 0–5%, and a softening temperature (TMA) of 70°–250° C., preferably 80°–200° C. and especially 90°–180° C.

The first to third cycloolefin random copolymer compositions of the invention may be incorporated, in addition to the above-mentioned cycloolefin resins, with rubber component in order to improve impact strength or with such additives as heat stabilizers, weathering stabilizers, antistatic agents, slip agents, antiblocking agents, antifoggants, lubricants, dyes, pigments, natural oils, synthetic oils and waxes, and these materials may be used in appropriate proportions. The stabilizers which are incorporated into the resin compositions of the invention include concretely, for example, phenolic antioxidants such as tetrakis methylene-3-(3,5-di-t-butyl-4-hydroxyphenyl)propionate methane, β-(3,5-di-t-butyl-4-hydroxyphenyl)propionic acid alkyl ester and 2,2'-oxamidobis[ethyl-3-(3,5-di-t-butyl-4-hydroxyphenyl)]propionate; metal salts of fatty acids such as zinc stearate, calcium stearate and calcium 12-hydroxystearate; and fatty esters of polyhydric alcohols such as glycerol monostearate, glycerol monolaurate, glycerol distearate, pentaerythritol monostearate, pentaerythritol distearate and pentaerythritol tristearate. These stabilizers may be used singly or in combination, for example, tetrakis[methylene-3-(3,5-di-t-butyl-4-hydroxyphenyl)propionate]methane may be used in combination with zinc stearate and glycerol monostearate.

In the present invention, it is preferable to use particularly a combination of phenolic antioxidant with fatty ester of polyhydric alcohol, said fatty ester including preferably those of polyhydric alcohols having at least three valences, the alcoholic hydroxyl groups of which have been esterified. Examples of the fatty ester of such polyhydric alcohols as mentioned above include concretely fatty esters of glycerol such as glycerol monostearate, glycerol monolaurate, glycerol monopalmitate, glycerol distearate and glycerol dilaurate; and fatty esters of pentaerythritol such as pentaerythritol monostearate, pentaerythritol monolaurate, pentaerythritol dilaurate, pentaerythritol distearate and pentaerythritol tristearate. The phenolic antioxidants as illustrated above are used in an amount, based on 100 parts by weight of the cycloolefin resin, of 0-10 parts by weight, preferably 0-5 parts by weight and especially 0-2 parts by weight, and the fatty esters of polyhydric alcohols are used in an amount, based on 100 parts by weight of the cycloolefin resin, of 0-10 parts by weight, preferably 0-5 parts by weight.

The cycloolefin random copolymer compositions of the invention may be mixed with various fillers in such an amount that they do not throw hindrances in the way of the objects of the invention, said fillers including silica, diatomaceous earth, alumina, titanium oxide, magnesium oxide, pumica powder, pumica balloon, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flake, glass bead, calcium silicate, montmorillonite, bentonite, graphite, aluminum powder, molybdenum sulfide, boron fiber, silicon carbide fiber, polyethylene fiber, polypropylene fiber, polyester fiber and polyamide fiber.

The substrates for information recording media of the present invention are formed from the cycloolefin random copolymer compositions as illustrated above, and they are not limited particularly in shape, for example, they may be used in the form of so-called sandwich structure wherein an air layer is sandwiched between two sheets of substrate.

The optical materials of the present invention are formed from the cycloolefin random copolymer compositions as mentioned above, and they are not limited particularly in shape and may be used, for example, in the form of optical lens and optical fiber.

The substrates for information recording media and optical materials of the present invention may be formed according to known molding methods such as extrusion molding, injection molding, etc., by molding the cycloolefin random copolymer compositions of the invention into desired forms.

EFFECT OF THE INVENTION

As stated hereinbefore, the first to third cycloolefin random copolymer compositions of the present invention are mixed with at least two kinds of cycloolefin random copolymers so that the compositions can satisfy the specific requisites as defined in the invention, hence there can be improved the moldability and transferability of recorded information of the compositions when they are formed into articles, for example, optical instrument parts such as substrates for information recording media, and adhesion of the substrates to information recording films, without marring excellent transparency inherent to cycloolefin resins. Thus the resin compositions of the invention are suitable for use in preparing optical materials such as substrates for information recording media or optical lens or optical fiber, which are excellent in various characteristics such as heat resistance, thermal aging resistance, mechanical characteristics, chemical resistance and electric characteristics.

Embodiment

Examples and comparative examples are given below to illustrate the present invention, but it should be construed that the invention is in no way limited to those examples.

Samples obtained respectively in the following examples were tested and evaluated for various physical properties by the following procedures.

(1) Intrinsic viscosity $[\eta]$ was measured by a Ubbelohde's viscometer in a decalin solution at 135° C.

(2) Molecular weight distribution Mw/Mn was determined by GPC (Gel permeation chromatography).

(3) Volatile content (Vm) was determined by measuring the weight loss of a test sample under the conditions of 300° C., 1 Torr and 1 hr, and the volatile content as determined was expressed in terms of weight percentage.

(4) The test sample was prepared by using an injection molding machine IS 55EPN manufactured and sold by Toshiba Machine Co.,Ltd. and a mold for test sample under the following molding conditions. The test sample as prepared was allowed to stand for 48 hours at room temperature, followed by putting to the test.

Molding conditions:
Cylinder temp.—220° C.
Mold temp.—60° C.
Injection pressure
primary/secondary=1000/800 kg/cm$^2$
Injection speed (primary)—30 mm/sec
Screw revolution—150 rpm (5) Softening temperature (TMA) was determined by observation of thermal deformation behavior of the test sample sheet of 1 mm in thickness using a thermal mechanical analyzer manufactured and sold by Du Pont Co. That is, a quartz needle was placed under a load of 49 g on the test sample sheet, while elevating the temperature of said sheet at a rate of 5° C./min, and the temperature at which the needle penetrated through the sheet to a depth of 0.635 mm was taken as TMA.

(6) Transparency was evaluated by measuring a pressed sheet of of 1 mm in thickness prepared from the test sample by means of a haze meter in accordance with ASTM D 1003 52.

(7) Flowability was determined by MFR$_{10}$/MFR$_{2.16}$ ratio. MFR$_{2.16}$ was measured at 260° C. under a load of 2.16 kg in accordance with ASTM D 1238, and MFR$_{10}$ was measured in the same manner except that the load used was 10 kg. The flowability was evaluated by way of MFRr which is a MFR$_{10}$/MFR$_{2.16}$ ratio. Generally, the test sample having a large MFRr is excellent in flowability and also in transferability of recorded information.

(8) Groove transferability was evaluated by microscopic observation of the shape of groove formed on one surface of a disc plate, 1 mm thick and 80 mm$\phi$, prepared by an injection molding machine IS 55EPN manufactured and sold by Toshiba Machine Co., Ltd., said disc plate having a mirror surface on one side and a spiral groove, interval 1.4 μm, depth 0.01 μm and width 5 μm, on the other side.

(9) Melt flow index (MFR) was measured at 260° C. and under a load of 2.16 kg in accordance with ASTM D 1238.

(10) Glass transition (Tg) was measured at a rate of temperature increase of 10° C./min by means of a measuring instrument DSC-20 manufactured and sold by Seiko Denshi Kogyo K.K.

(11) Film adherability was evaluated in the following manner. That is, a disc plate of 1 mm in thickness and 80 mmφ having a mirror surface on one side and a spiral groove on the other side (interval 1.4 μm, depth 0.09 μm and width 0.5 μm) was formed by means of an injection molding machine IS-55EPN manufactured and sold by Toshiba Machine Co., Ltd. The disc plate thus obtained was subjected to ultrasonic cleaning with Freon TE (a product of Mitsui Du Pont Fluorochemicals K.K.), and on the grooved surface thereof was then formed a three-layer film as an information recording film comprising $Si_3N_4$, TbFeCo and $Si_3N_4$ layers (without pretreatment such as pre-sputtering, and each layer having a film thickness of 500 Å) by the sputtering method. After confirmation with a microscopic observation that the film was formed satisfactorily, the disc plate thus prepared having film was allowed to stand for 170 hours in a thermo-hygrostat kept at 85% RH and 80° C., followed by microscopic observation for evaluation of the state of the film.

POLYMERIZATION EXAMPLE 1

Preparation of Ethylene/Cycloolefin Random Copolymer A

With a 1-liter reactor equipped with a stirring blade, there was carried out a copolymerization reaction between ethylene and tetracyclo[4,4,0,$1^{2.5}$,$1^{7.10}$]-3-dodecene (hereinafter abbreviated to TCD-3). That is, from the top of the reactor were continuously charged a solution of TCD-3 in cyclohexane at 0.4 liter/hour so that the TCD-3 concentration in the reactor became 80 g/l, a solution of $VO(OC_2H_5) Cl_2$ as a catalyst in cyclohexane at 0.5 liter/hour so that the vanadium concentration in the reactor became 0.5 m mol/l (in this time, the vanadium concentration of the fed solution was 2.86 times as large as that of the reactor), a solution of ethylaluminum sesquichloride ($Al(C_2H_5)_{1.5}Cl_{1.5}$) in cyclohexane at 0.4 liter/hour so that the aluminum concentration in the reactor became 4.0m mol/l, and cyclohexane at 0.7 liter/hour, while continuously withdrawing from the top of the reactor the polymer solution so that the volume of the polymer solution in the reactor was constantly 1 liter (that is, the average retention time being 0.5 hour). Simultaneously, into the reactor, ethylene was fed at a rate of 28 liter/hour, nitrogen was fed at 10 liter/hour, and hydrogen was fed at 0.5 liter/hour through bubbling tube. The copolymerization reaction was carried out at 10° C. by circulating a refrigement through a jacket fitted externally to the reactor. The copolymerization was carried out under the conditions illustrated above, whereupon a polymerization reaction mixture (polymer solution) containing an ethylene/TCD-3 random copolymer was obtained.

Methanol was added to the polymer solution withdrawn from the top of the polymerizer, and followed by stirring for 5 minutes. In this procedure, methanol was used in a ratio of 3.3 ml for 1 liter of the polymer solution.

Subsequently, HCl solution (water: conc. HCl=1 liter:0.5 ml) and the polymer solution were contacted under severely stirring in a 1:1 ratio by means of homomixer, thereby the catalyst residue was transferred to water phase. The mixture was placed in calm condition. After removing the water phase, the resultant was washed twice with distilled water. Thus the polymer solution was purified and separated.

Thereafter, the polymer solution was poured into mixer containing acetone of three times the volume of the polymer solution, thereby obtaining the resulting solid parts by filtration, and the solid parts was washed with acetone.

The solid parts obtained by the above mentioned depositing procedures was poured into acetone so that the concentration became 40 g/liter, and subjected to extraction treatment for 2 hours at 60° C. After the treatment as above, the solid parts were collected by filtration and dried under nitrogen flow for 24 hours at 130° C., 350 mmHg.

By the procedures as mentioned above, the ethylene/TCD-3 copolymer was obtained in an amount of 130 g/hour (namely, the yield is 65 g/liter).

The thus obtained copolymer had an ethylene content of 63.1 mol %, an intrinsic viscosity [η] of 0.95 dl/g, Mw/Mn as measured by GPC of 2.90, and TMA of 152° C.

The results are shown in Table A.

POLYMERIZATION EXAMPLES 2 TO 19

Preparation of Ethylene/Cycloolefin Random Copolymers B to T

The procedures of the polymerization Example 1 was repeated except that the polymerization conditions were changed as shown in Table A.

The results are shown in Table A.

TABLE A

| Polymerization No. | TCD-3 Copolymer Component | TCD-3 feed concentration (g/l) | Amount of feed gas (l/hr) ethylene | N₂ | H₂ | Yield (g/l) | Composition (mol %) ethylene | TCD-3 | TMA (°C.) | [η] (dl/g) | MFR (g/10 min) | Mw/Mn |
|---|---|---|---|---|---|---|---|---|---|---|---|---|
| 1 | A | 80 | 28 | 10.0 | 0.5 | 65 | 63.1 | 36.9 | 152 | 0.95 | — | 2.9 |
| 2 | B | 50 | 17 | 10.0 | 0.0 | 45 | 62.5 | 37.5 | 151 | 0.75 | — | 6.3 |
| 3 | C | 60 | 20 | 10.0 | 0.4 | 49 | 62.8 | 37.2 | 150 | 0.60 | — | 2.8 |
| 4 | D | 60 | 20 | 9.0 | 1.0 | 48 | 61.9 | 38.1 | 148 | 0.47 | — | 2.7 |
| 5 | E | 60 | 20 | 5.0 | 5.0 | 45 | 64.8 | 35.2 | 146 | 0.30 | — | 2.9 |
| 6 | F | 60 | 20 | 3.0 | 7.0 | 41 | 62.3 | 37.7 | 149 | 0.22 | — | 2.8 |
| 7 | G | 20 | 7 | 40 | 0.0 | 17 | 62.1 | 37.9 | 150 | 0.21 | — | 5.9 |
| 8 | H | 70 | 20 | 10.0 | 0.5 | 57 | 56.0 | 44.0 | 178 | 0.50 | 20 | 2.8 |
| 9 | I | 60 | 20 | 9.3 | 0.7 | 49 | 62.5 | 37.5 | 153 | 0.48 | 21 | 2.9 |
| 10 | J | 40 | 20 | 10.0 | 0.5 | 59 | 72.0 | 28.0 | 112 | 0.54 | 38 | 2.7 |
| 11 | K | 30 | 20 | 10.0 | 0.5 | 63 | 81.5 | 18.5 | 71 | 0.51 | 32 | 2.8 |

TABLE A-continued

| Polymerization No. | Copolymer Component | TCD-3 feed concentration (g/l) | Amount of feed gas (l/hr) | | | Yield (g/l) | Basic Properties of Copolymer | | | | | |
|---|---|---|---|---|---|---|---|---|---|---|---|---|
| | | | ethylene | $N_2$ | $H_2$ | | Composition (mol %) | | TMA (°C.) | [$\eta$] (dl/g) | MFR (g/10 min) | Mw/Mn |
| | | | | | | | ethylene | TCD-3 | | | | |
| 12 | L | 70 | 20 | 9.5 | 1.0 | 54 | 58.0 | 42.0 | 169 | 0.40 | 21 | 2.8 |
| 13 | M | 45 | 20 | 10.0 | 0.5 | 59 | 66.8 | 33.2 | 131 | 0.49 | 32 | 2.7 |
| 14 | N | 38 | 20 | 10.0 | 0.5 | 53 | 73.2 | 26.8 | 103 | 0.51 | 35 | 2.8 |
| 15 | P | 35 | 20 | 10.0 | 0.5 | 54 | 76.6 | 23.4 | 88 | 0.52 | 35 | 2.8 |
| 16 | Q | 32 | 20 | 10.0 | 0.5 | 55 | 80.3 | 19.7 | 72 | 0.54 | 33 | 2.9 |
| 17 | R | 25 | 20 | 9.5 | 1.0 | 51 | 86.3 | 13.7 | 51 | 0.60 | 18 | 2.9 |
| 18 | S | 22 | 20 | 8.5 | 2.0 | 43 | 87.8 | 12.2 | 34 | 0.71 | 28 | 3.0 |
| 19 | T | 18 | 20 | 7.5 | 3.0 | 30 | 90.0 | 10.0 | 12 | 0.80 | 19 | 3.0 |

—: Not measured

EXAMPLE 1

A thorough mixture comprising 50% by weight of a random copolymer of ethylene and tetracyclo [4, 4, 0,1$^{2.5}$, 1$^{7.10}$]-3-dodecene (hereinafter abbreviated to TCD-3) having the content, as measured by $^{13}$C-NMR, of ethylene of 62.8 mol %, of TCD-3 of 37.2 mol %, TMA of 150° C., [$\eta$] of 0.60 dl/g, and Mw/Mn of 2.8 (hereinafter called C component) and 50% by weight of an ethylene/TCD-3 random copolymer having the content, as measured by $^{13}$C-NMR, of ethylene of 64.8 mol % and of TCD-3 of 35.2 mol %, TMA of 146° C., [$\eta$] of 0.30 dl/g and Mw/Mn of 2.9 (hereinafter called E component) was melt blended at a cylinder temperature of 220° C. by means of a twin-screw extruder (PCM 45, manufactured and sold by Ikegai Iron Works, Ltd.), and the blend was then pelletized by means of a pelletizer to prepare a cycloolefin random copolymer composition. The pellets thus obtained were molded according to the aforementioned procedure into a test sample, the physical properties of which were then evaluated.

Results obtained are shown in Table 1.

EXAMPLE 2

A cycloolefin random copolymer composition was prepared by repeating Example 1 except that there was used a thorough mixture comprising 20% by weight of an ethylene/TCD-3 random copolymer having the ethylene content of 63.1 mol % and TCD-3 content of 36.9 mol %, both measured by $^{13}$C-NMR, TMA of 152° C., [$\eta$] of 0.95 and Mw/Mn of 2.9 (hereinafter called A component), 40% by weight of C component and 40% by weight of an ethylene/TCD-3 random copolymer having the ethylene content of 62.3 mol % and TCD-3 content of 37.7 mol %, both measured by $^{13}$C-NMR, TMA of 149 C., [$\eta$] of 0.22 dl/g and Mw/Mn of 2.8 (hereinafter called F component). The resulting pellets were molded according to the aforementioned procedure into a test sample, the physical properties of which were then evaluated.

Results obtained are shown in Table 1.

COMPARATIVE EXAMPLE 1

A cycloolefin random copolymer composition was prepared by repeating Example 1 except that there was used a thorough mixture comprising 50% by weight of an ethylene/TCD-3 random copolymer having the ethylene content of 62.5 mol % and TCD-3 content of 37.5 mol %, both measured by $^{13}$C-NMR, TMA of 151° C., [$\eta$] of 0.75 dl/g and Mw/Mn of 6.3 (hereinafter called B component) and 50% by weight of F component. The resulting pellets were molded according to the aforementioned procedure into a test sample, the physical properties of which were evaluated.

Results obtained are shown in Table 1.

COMPARATIVE EXAMPLE 2

A cycloolefin random copolymer composition was prepared by repeating Example 1 except that there was used a thorough mixture comprising 50% by weight of C component and 50% by weight of an ethylene/TCD-3 random copolymer (hereinafter called G component) having the ethylene content of 62.1 mol % and TCD-3 content of 37.9 mol %, both measured by $^{13}$C-NMR, TMA of 150° C., [$\eta$] of 0.21 dl/g and Mw/Mn of 5.9. The resulting pellets were molded according to the aforementioned procedure into a test sample, the physical properties of which were evaluated.

Results obtained are shown in Table 1.

COMPARATIVE EXAMPLE 3

A cycloolefin random copolymer composition was prepared by melting an ethylene/TCD-3 random copolymer having the ethylene content of 61.9 mol % and TCD-3 content of 38.1 mol %, both measured by $^{13}$C-NMR, TMA of 148° C., [$\eta$] of 0.47 dl/g and Mw/Mn of 2.7 (hereinafter called D component) by means of a twin-screw extruder (PCM 45 manufactured and sold by Ikegai Iron Works, Ltd.) at a cylinder temperature of 220° C., and pelletizing the resulting melt with a pelletizer. The resulting pellets were molded according to the aforementioned procedure into a test sample, the physical properties of which were then evaluated.

Results obtained are shown in Table 1.

TABLE 1

| Physical properties of each component | | | Ex. 1 Compn. (%) | Ex. 2 Compn. (%) | Com. Ex. 1 Compn. (%) | Com. Ex. 2 Compn. (%) | Com. Ex. 3 Compn. (%) |
|---|---|---|---|---|---|---|---|
| | [$\eta$] | Mw/Mn | | | | | |
| A | 0.95 | 2.9 | — | 20 | — | — | — |
| B | 0.75 | 6.3 | — | — | 50 | — | — |
| C | 0.60 | 2.8 | 50 | 40 | — | 50 | — |
| D | 0.47 | 2.7 | — | — | — | — | 100 |
| E | 0.30 | 2.9 | 50 | — | — | — | — |
| F | 0.22 | 2.8 | — | 40 | 50 | — | — |
| G | 0.21 | 5.9 | — | — | — | 50 | — |

TABLE 1-continued

| | | | | | |
|---|---|---|---|---|---|
| Mw/Mn | 3.9 | 4.5 | 4.3 | 4.2 | 2.7 |
| [η] (dl/g) | 0.44 | 0.50 | 0.47 | 0.39 | 0.47 |
| Haze (%) | 2.7 | 3.1 | 11.4 | 3.2 | 2.9 |
| MFRr | 14.1 | 18.5 | 15.2 | 14.2 | 11.3 |
| Vm (Wt %) | 0.3 | 0.5 | 0.4 | 3.2 | 0.3 |
| Transparency | ○ | ○ | x | ○ | ○ |
| Transferability | ○ | ○ | ○ | ○ | Δ |
| Volatile content | Small | Small | Small | Large | Small |

○: Very good
Δ: Good
x: Bad

EXAMPLE 3

A thorough mixture comprising 55% by weight of an ethylene/TCD-3 random copolymer having the ethylene content of 56.0 mol % and TCD-3 content of 44.0 mol %, both measured by $^{13}$C-NMR, MFR (260° C.) of 20 g/10 min, an intrinsic viscosity [η], as measured in decalin at 135° C., of 0.50 dl/g, TMA of 178° C., Tg of 151° C. and Mw/Mn of 2.8 (hereinafter called H component) and 45% by weight of an ethylene/TCD-3 random copolymer having the ethylene content of 72.0 mol % and TCD-3 content of 28.0 mol %, both measured by $^{13}$C-NMR, MFR (260° C.) of 38 g/10 min, an intrinsic viscosity [η], as measured in decalin at 135° C., of 0.54 dl/g, TMA of 112° C., Tg of 91° C. and Mw/Mn of 2.7 (hereinafter called J component) was melt blended at a cylinder temperature of 220° C. by means of a twin-screw extruder (PCM 45 manufactured and sold by Ikegai Iron Works, Ltd.) to prepare a cycloolefin random copolymer composition. The composition thus obtained had a weight average cycloolefin content (Cw) of 36.8, a number average cycloolefin content (Cn) of 35.0, and a Cw/Cn ratio of 1.051. This composition was pelletized by means of a pelletizer.

The pellets thus obtained were molded according to the aforementioned procedure into a test sample, the physical properties of which were then evaluated.

Results obtained are shown in Table 2.

EXAMPLE 4

A cycloolefin random copolymer composition was prepared by repeating Example 3 except that there was used a thorough mixture comprising 70% by weight of H component and 30% by weight of an ethylene/TCD-3 random copolymer having the ethylene content of 81.5 mol % and TCD-3 content of 18.5 mol %, both measured by $^{13}$C-NMR, MFR (260° C.) of 32 g/10 min, an intrinsic viscosity [η], as measured in decalin at 135° C., of 0.51 dl/g, TMA of 71° C., Tg of 48° C. and Mw/Mn of 2.8 (hereinafter called K component). The composition thus obtained had a weight average cycloolefin content (Cw) of 36.4 and a number average cycloolefin content (Cn) of 31.1, and a Cw/Cn ratio of 1.170. The above-mentioned composition was pelletized by means of a pelletizer, and a test sample was prepared according to the aforementioned procedure from the pellets thus obtained. The test sample thus prepared was then tested for physical properties.

Results obtained are shown in Table 2.

EXAMPLE 5

A cycloolefin random copolymer composition was prepared by repeating Example 3 except that there was used a thorough mixture comprising 70% by weight of H component, 5% by weight of J component, 20% by weight of K component and 5% by weight of an ethylene/TCD-3 random copolymer having the ethylene content of 62.5 mol % and TCD-3 content of 37.5 mol %, both measured by $^{13}$C-NMR, MFR (260° C.) of 21 g/10 min, an intrinsic viscosity [η], as measured in decalin at 135° C., of 0.48 dl/g, TMA of 153° C., Tg of 131° C. and Mw/Mn of 2.9 (hereinafter called I component). The composition thus obtained had a weight average cycloolefin content (Cw) of 37.8, a number average cycloolefin content (Cn) of 33.5, and a Cw/Cn ratio of 1.128. The above-mentioned composition was pelletized by means of a pelletizer, and the resulting pellets were formed according to the aforementioned procedure into a test sample, the physical properties of which were then evaluated.

Results obtained are shown in Table 2.

COMPARATIVE EXAMPLE 4

Component I was molded alone into a test sample, the physical properties of which were then evaluated.

Results obtained are shown in Table 2.

TABLE 2

| | TMA (°C.) | (η) (dl/g) | Mw/Mn |
|---|---|---|---|
| Component (H) | 178 | 0.50 | 2.8 |
| Component (I) | 153 | 0.48 | 2.9 |
| Component (J) | 112 | 0.54 | 2.7 |
| Component (K) | 71 | 0.51 | 2.8 |

| | Ex. 3 | Ex. 4 | Ex. 5 | Comp. Ex. 4 |
|---|---|---|---|---|
| Component (H) Wt % | 0.55 | 0.70 | 0.70 | 0 |
| Component (I) Wt % | 0 | 0 | 0.05 | 1.00 |
| Component (J) Wt % | 0.45 | 0 | 0.05 | 0 |
| Component (K) Wt % | 0 | 0.30 | 0.20 | 0 |
| TMA (°C.) | 148 | 146 | 152 | 153 |
| $\overline{Cw}$ (mol %) | 36.8 | 36.4 | 37.8 | 37.5 |
| $\overline{Cn}$ (mol %) | 35.0 | 31.1 | 33.5 | 37.5 |
| $\overline{Cw}/\overline{Cn}$ | 1.051 | 1.170 | 1.128 | 1.000 |
| MFRr | 12.2 | 13.5 | 13.0 | 11.2 |
| Transferability | ○ | ○ | ○ | Δ |

○: Excellent
Δ: Good

EXAMPLE 6

A thorough mixture comprising 26% by weight of an ethylene/TCD-3 random copolymer having the ethylene content of 58.0 mol % and TCD-3 content of 42.0 mol %, both measured by $^{13}$C-NMR, MFR (260° C.) of 21 g/10 min, and TMA of 169° C. (hereinafter called L component), 50% by weight of an ethylene/TCD-3 random copolymer having the ethylene content of 66.8 mol % and TCD-3 content of 33.2 mol %, both measured by $^{13}$C-NMR, MFR (260° C.) of 32 g/10 min, and TMA of 131° C. (hereinafter called M component), 8% by weight of an ethylene/TCD-3 random copolymer having the ethylene content of 76.6 mol % and TCD-3 content of 23.4 mol %, both measured by $^{13}$C-NMR, MFR (260° C.) of 35 g/10 min, and TMA of 88° C. (hereinafter called P component), 8% by weight of an ethylene/TCD-3 random copolymer having the ethylene content of 86.3 mol % and TCD-3 content of 13.7 mol %, both measured by $^{13}$C-NMR, MFR (260° C.) of 18 g/10 min, and TMA of 51° C. (hereinafter called R component), and 8% by weight of an ethylene/TCD-3 random copolymer having the ethylene content of 90.0 mol % and TCD-3 content of 10.0 mol %, MFR (260° C.) of 19 g/10 min, and TMA of 12° C. (hereinafter called T component) was melt blended at a cylinder temperature of 220° C. by means of a twin-screw extruder (PCM45 manufactured and sold by Ikegai Iron Works, Ltd.), and the blend was pelletized by means of a pelletizer to obtain a cycloolefin random copolymer composition. The pellets thus obtained were molded according to the aforementioned procedure into a test sample, the physical properties of which were evaluated. Results obtained are shown in Table 3.

EXAMPLE 7

A cycloolefin random copolymer composition was prepared by repeating Example 6 except that there was used a thorough mixture comprising 15% by weight of L component, 50% by weight of M component, 14% by weight of an ethylene/TCD-3 random copolymer having the ethylene content of 73.2 mol % and TCD-3 content of 26.8 mol %, both measured by $^{13}$C-NMR, MFR (260° C.) of 35 g/10 min, and TMA of 103° C. (hereinafter called N component), 9% by weight of an ethylene/TCD-3 random copolymer having the ethylene content of 80.3 mol % and TCD-3 content of 19.7 mol %, both measured by $^{13}$C-NMR, MFR (260° C.) of 33 g/10 min, and TMA of 72° C. (hereinafter called Q component), 6% by weight of an ethylene/TCD-3 random copolymer having the ethylene content of 87.8 mol % and TCD-3 content of 12.2 mol %, both measured by $^{13}$C-NMR, MFR (260° C.) of 28 g/10 min, and TMA of 34° C. (hereinafter called S component), and 6% by weight of T component. Pellets obtained from the composition were molded according to the aforementioned procedure into a test sample, the physical properties of which were then evaluated. Results obtained are shown in Table 3.

COMPARATIVE EXAMPLE 5

A cycloolefin random copolymer composition was prepared by repeating Example 6 except that there was used a thorough mixture comprising 26% by weight of L component, 50% by weight of M component, 12% by weight of P component and 12% by weight of T component. Pellets obtained from the composition were molded according to the aforementioned procedure into a test sample, the physical properties of which were then evaluated.

COMPARATIVE EXAMPLE 6

A cycloolefin random copolymer composition was prepared by repeating Example 6 except that there was used a thorough mixture comprising 26% by weight of L component, 50% by weight of M component, 20% by weight of P component, 2% by weight of R component and 2% by weight of T component. Pellets obtained from the composition thus prepared were molded according to the aforementioned procedure into a test sample, the physical properties of which were then evaluated. Results obtained are shown in Table 3.

COMPARATIVE EXAMPLE 7

A cycloolefin random copolymer composition was prepared by repeating Example 6 except that there was used a thorough mixture comprising 30% by weight of N component, 30% by weight of Q component, 20% by weight of S component and 20% by weight of T component. Pellets obtained from the composition thus prepared were molded according to the aforementioned procedure into a test sample, the physical properties of which were then evaluated. Results obtained are shown in Table 3.

TABLE 3

| Component | TMA (°C.) | Ex. 6 Composition (Wt %) | Ex. 6 Haze (%) of mixture consisting of adjacent two components | Ex. 7 Composition (Wt %) | Ex. 7 Haze (%) of mixture consisting of adjacent two components | Comp. Ex. 5 Composition (Wt %) | Comp. Ex. 5 Haze (%) of mixture consisting of adjacent two components | Comp. Ex. 6 Composition (Wt %) | Comp. Ex. 6 Haze (%) of mixture consisting of adjacent two components | Comp. Ex. 7 Composition (Wt %) | Comp. Ex. 7 Haze (%) of mixture consisting of adjacent two components |
|---|---|---|---|---|---|---|---|---|---|---|---|
| L | 169 | 26 | 5.0 | 15 | 4.3 | 26 | 5.0 | 26 | 5.0 | — | |
| M | 131 | 50 | | 50 | | 50 | | 50 | | — | |
| N | 103 | — | 2.8 | 14 | 2.9 | — | 3.5 | — | 3.2 | 30 | 3.8 |
| P | 88 | 8 | | — | 3.7 | 12 | | 20 | | — | |
| Q | 72 | — | 4.8 | 9 | | — | | — | 2.5 | 30 | 4.3 |
| R | 51 | 8 | | — | 4.3 | — | 25.3 | 2 | | — | |
| S | 34 | — | 4.0 | 6 | 3.3 | — | | — | 4.0 | 20 | 3.3 |
| T | 12 | 8 | | 6 | | 12 | | 2 | | 20 | |
| Haze (%) | | 4.5 | | 3.9 | | 18.9 | | 3.7 | | 4.1 | |
| TMA (°C.) | | 122 | | 116 | | 121 | | 127 | | 60 | |
| Heat resistance | | ○ | | ○ | | ○ | | ○ | | X | |
| Transparency of disc plate | | ○ | | ○ | | X | | ○ | | ○ | |
| Transferability to disc plate | | ○ | | ○ | | ○ | | Δ | | ○ | |
| Film adhesibility after environmental test | | ○ | | ○ | | ○ | | Δ | | ○ | |

○: Excellent
Δ: Good
X: Bad

What is claimed is:

1. A cycloolefin random copolymer composition containing at least three cycloolefin random copolymers obtained by copolymerization of ethylene and at least one cycloolefin represented by the following formula (I) or (II), wherein said composition has a softening temperature (TMA) of 70° C. to 250° C., and when cycloolefin random copolymer components constituting the composition are taken as $S_1, S_2 \ldots S_i \ldots S_n$ (n is an integer of at least 3), a softening temperature (TMA) of each component ($S_i$) is taken as $T_i(°C.)$, and a weight percentage of each component ($S_i$) present in the composition is taken as $W_i$ (i is an integer of 1 to n), $T_i$ and $W_i$ satisfy the following formulas (3), (4) and (5), $$T_i < T_{i+1} \quad (3)$$

wherein i is an integer of 1 to n−1, $$T_1 < 70 \ (°C.) \quad (4)$$

and $$0.01 \leq W_i / \sum_{i=1}^{n} W_i \leq 0.99, \quad (5)$$

a two-components composition containing the components $S_i$ and $S_{i+1}$ in a blend ratio of $W_i:W_{i+1}$ by weight has a haze of not more than 7.0%, and the sum total of the components having a softening temperature of less than 70° C. is more than 10 wt % of the whole composition;

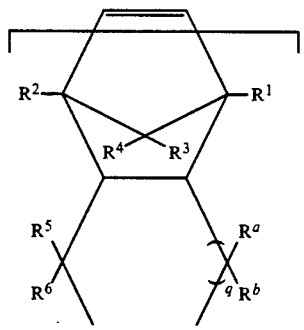
(I)

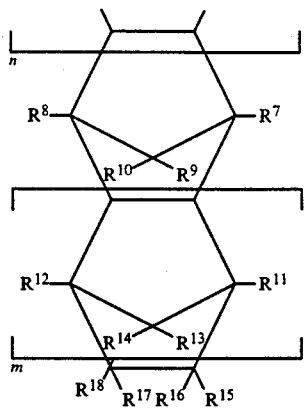

-continued wherein n is 0 or 1, m is 0 or an integer of a positive number, q is 0 or 1, $R^1$-$R^{18}$ and $R^a$ and $R^b$ are each an atom or a group selected from the group consisting of hydrogen atom, halogen atom and hydrocarbon groups, $R^{15}$-$R^{18}$, linked with one another, may form a monocyclic ring or polycyclic ring which may have a double bond, $R^{15}$ and $R^{16}$, or $R^{17}$ and $R^{18}$ may together form an alkylidene group;

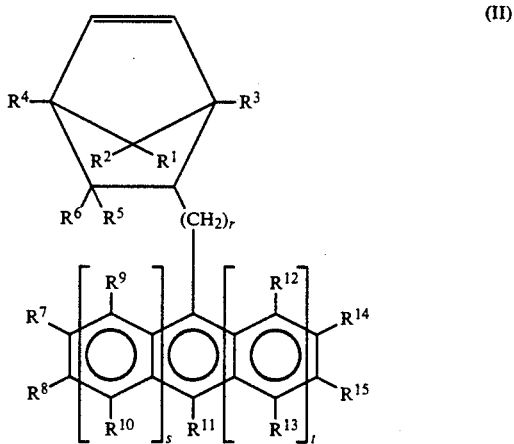
(II)

wherein r is 0 or an integer of more than 1, s and t are each 0, 1 or 2, $R^1$-$R^{15}$ are each an atom or a group selected from the group consisting of hydrogen atom, halogen atom, aliphatic hydrocarbon groups, aromatic hydrocarbon groups and alkoxy groups, and the carbon atom having $R^5$ and $R^6$ may be bonded to the carbon atom having $R^7$ or $R^9$ directly or through an alkylene group of 1-3 carbon atoms.

2. A substrate for information recording medium, which is formed form the composition as claimed n claim 1.

3. An optical material, which is formed from the composition as claimed in claim 1.

* * * * *

UNITED STATES PATENT AND TRADEMARK OFFICE
CERTIFICATE OF CORRECTION

PATENT NO. : 5,239,006
DATED : AUGUST 24, 1993
INVENTOR(S) : TOSHIHIRO SAGANE and MASAYUKI OKABE It is certified that error appears in the above-identified patent and that said Letters Patent is hereby corrected as shown below:

Claim 2, column 40, line 56, delete "which is formed form the composition as claimed n"

and insert --which is formed from the composition as claimed in--.

Signed and Sealed this

Thirtieth Day of August, 1994

Attest:

BRUCE LEHMAN

*Attesting Officer*    *Commissioner of Patents and Trademarks*